(12) United States Patent
Kosaka et al.

(10) Patent No.: US 10,689,060 B2
(45) Date of Patent: Jun. 23, 2020

(54) BICYCLE OPERATING DEVICE

(71) Applicant: Shimano Inc., Sakai, Osaka (JP)

(72) Inventors: Kentaro Kosaka, Osaka (JP);
Kazunori Ookubo, Osaka (JP);
Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 173 days.

(21) Appl. No.: 14/878,207

(22) Filed: Oct. 8, 2015

(65) Prior Publication Data
US 2017/0101154 A1  Apr. 13, 2017

(51) Int. Cl.
*B62K 23/06* (2006.01)
*B62L 3/02* (2006.01)
*B62M 25/04* (2006.01)

(52) U.S. Cl.
CPC .............. *B62K 23/06* (2013.01); *B62L 3/02* (2013.01); *B62M 25/04* (2013.01)

(58) Field of Classification Search
CPC ..... B62K 23/06; B62M 25/04; B62M 25/045; B62L 3/02
See application file for complete search history.

(56) References Cited

U.S. PATENT DOCUMENTS

| 8,746,106 B2* | 6/2014 | Miki ................... B62M 25/04 74/486 |
| 8,777,788 B2 | 7/2014 | Kawakami et al. |
| 2012/0297919 A1 | 11/2012 | Fukao et al. |

* cited by examiner

*Primary Examiner* — Thomas C Diaz
(74) *Attorney, Agent, or Firm* — Global IP Counselors, LLP

(57) ABSTRACT

A bicycle operating device is basically provided with a support structure, a first release member, a second release member and a select member. The first release member is movably supported on the support structure between a first non-releasing position and a first releasing position. The second release member is movably supported on the support structure between a second non-releasing position and a second releasing position. The select member is movably supported on the support structure between at least a first select position and a second select position. The select member permits movement of the first release member and prevents movement of the second release member while the select member is in the first select position. The select member permits movement of the second release member and prevents movement of the first release member while the select member is in the second select position.

19 Claims, 29 Drawing Sheets

BICYCLE OPERATING DEVICE

BACKGROUND

Field of the Invention

This invention generally relates to a bicycle operating device. More specifically, the present invention relates to a bicycle operating device, which is used to selectively operate a bicycle component.

Background Information

Many bicycles have bicycle components that are moved between various positions. For example, a gear shift operating device (bicycle shifter) is one example of a bicycle operating device. In this type of gear shift operating device, a bicycle component positioning unit is often provided for controlling a shifting device for changing speed stages. The gear shift operating device is connected to the shifting device with, for example, a Bowden-type gear shift cable. The gear shift operating device is configured and arranged to allow a user to operate the shifting device by operating, for example, a lever or other such operating member of the gear shift operating device. One example of a bicycle operating device (bicycle shifter) is disclosed in U.S. Patent Application Publication No. 2012/0297919A1, which is assigned to Shimano Inc.

In addition to gear shift operating device, other bicycle components are also provided with a bicycle component positioning unit. For example, a shifting device such as a derailleur can be provided with a bicycle operating device including a bicycle component positioning unit as disclosed in U.S. Pat. No. 8,777,788, which is assigned to Shimano Inc.

SUMMARY

Generally, the present disclosure is directed to various features of a bicycle operating device.

In view of the state of the known technology and in accordance with a first aspect of the present disclosure, a bicycle operating device is provided that basically comprises a support structure, a first release member, a second release member and a select member. The first release member is movably supported on the support structure between a first non-releasing position and a first releasing position. The second release member is movably supported on the support structure between a second non-releasing position and a second releasing position. The select member is movably supported on the support structure between at least a first select position and a second select position. The select member permits movement of the first release member and prevents movement of the second release member while the select member is in the first select position. The select member permits movement of the second release member and prevents movement of the first release member while the select member is in the second select position.

In accordance with a second aspect of the present invention, the bicycle operating device according to the first aspect is configured so that the first and second release members are rotatably supported on the support structure about a rotational axis.

In accordance with a third aspect of the present invention, the bicycle operating device according to the second aspect is configured so that the first release member is axially offset from the second release member along the rotational axis.

In accordance with a fourth aspect of the present invention, the bicycle operating device according to the first aspect further comprises a first release pawl and a second release pawl. The first release member includes a first release plate having a first pawl contact that is engaged by the first release pawl while the select member is in the first select position. The second release member includes a second release plate having a second pawl contact that is engaged by the second release pawl while the select member is in the second select position.

In accordance with a fifth aspect of the present invention, the bicycle operating device according to the fourth aspect further comprises a first operating member movably supported on the support structure between a rest position and an operated position. The first and second release pawls are mounted on the first operating member.

In accordance with a sixth aspect of the present invention, the bicycle operating device according to the fifth aspect is configured so that the first operating member is pivotally supported on the support structure.

In accordance with a seventh aspect of the present invention, the bicycle operating device according to the sixth aspect is configured so that the first and second release members are rotatably supported on the support structure about a rotational axis. The first operating member has a pivot axis that is coaxial with the rotational axis of the first and second release members.

In accordance with an eighth aspect of the present invention, the bicycle operating device according to the first aspect is configured so that further comprises a control body and a biasing element. The control body movably supports the select member. The select member is movably arranged on the control body to move within a prescribed range relative to the control body. The biasing element is operatively coupled between the control body and the select member and biases the select member and the control body in opposite directions relative to each other.

In accordance with a ninth aspect of the present invention, the bicycle operating device according to the eighth aspect is configured so that the first and second release members, the select member and the control body are all rotatably supported on the support structure about a rotational axis, and the biasing element biasing the control body and the select member in opposite directions relative to each other around the rotational axis.

In accordance with a tenth aspect of the present invention, the bicycle operating device according to the ninth aspect is configured so that the control body includes a wire take-up member having an inner wire connection structure.

In accordance with an eleventh aspect of the present invention, the bicycle operating device according to the tenth aspect is configured so that the control body includes a positioning member non-movably coupled to the wire take-up member. The positioning member includes a plurality of positioning teeth defining a plurality of predetermined positions of the wire take-up member.

In accordance with a twelfth aspect of the present invention, the bicycle operating device according to the eleventh aspect is configured so that further comprises a first maintaining member and a second maintaining member. The first maintaining member is movably supported by the support structure to selectively move from a first maintaining position to a first non-maintaining position in response to movement of the first release member moving from the first non-releasing position to the first releasing position. The first maintaining member restricts movement of the positioning member and the wire take-up member in a first direction around the rotational axis while the first maintaining member is in the first maintaining position. The first maintaining member permits movement of the positioning member and the wire take-up member in the first direction around the rotational axis while the first maintaining member is in the first non-maintaining position. The second maintaining member is movably supported by the support structure to selectively move from a second maintaining position to a second non-maintaining position in response to movement of the second release member moving from the second non-releasing position to the second releasing position. The second maintaining member restricts movement of the positioning member and the wire take-up member in the first direction around the rotational axis while the second maintaining member is in the second maintaining position. The second maintaining member permits movement of the positioning member and the wire take-up member in the first direction around the rotational axis while the second maintaining member is in the second non-maintaining position.

In accordance with a thirteenth aspect of the present invention, the bicycle operating device according to the twelfth aspect is configured so that the first maintaining member includes a first maintaining pawl that is biased towards the first maintaining position to selectively engage one of the positioning teeth, and the second maintaining member includes a second maintaining pawl that is biased towards the second maintaining position to selectively engage one of the positioning teeth.

In accordance with a fourteenth aspect of the present invention, the bicycle operating device according to the twelfth aspect further comprises a first release pawl and a second release pawl. The first release member includes a first release plate having a first pawl contact that is engaged by the first release pawl while the select member is in the first select position. The second release member includes a second release plate having a second pawl contact that is engaged by the second release pawl while the select member is in the second select position. The first and second release pawls are biased towards engagement with the first and second release plates, respectively, but held out of engagement with the first and second release plates while the first and second operating members are in the first and second rest positions, respectively.

In accordance with a fifteenth aspect of the present invention, the bicycle operating device according to the fourteenth aspect further comprises a first operating member and a second operating member. The first operating member is movably supported on the support structure between a rest position and an operated position. The first and second release pawls are mounted on the first operating member. The second operating member is movably arranged to rotate the positioning member and the wire take-up member in a second direction as the second operating member moves from a second rest position to a second operated position.

In accordance with a sixteenth aspect of the present invention, the bicycle operating device according to the fifteenth aspect is configured so that the first and second operating members are configured to be biased towards the first and second rest positions, respectively.

In accordance with a seventeenth aspect of the present invention, the bicycle operating device according to the fifteenth aspect is configured so that the positioning member includes a plurality of pulling teeth. The second operating member includes a pulling pawl that engages the pulling teeth and rotates the positioning member and the wire take-up member in a second direction about the rotational axis as the second operating member moves from the second rest position to the second operated position. The second direction is opposite to the first direction with respect to the rotational axis. The pulling pawl is biased towards engagement with the pulling teeth while the first and second operating members are in the first and second rest positions, respectively.

In accordance with an eighteenth aspect of the present invention, the bicycle operating device according to the seventeenth aspect is configured so that the pulling pawl is moved out of a path of the pulling teeth as the first operating member moves from the first rest position toward the first operated position.

In accordance with a nineteenth aspect of the present invention, the bicycle operating device according to the eighteenth aspect is configured so that each of the first and second release members includes an abutment that moves the pulling pawl out of engagement with the pulling teeth as each of the first and second release members is moved by movement of the first operating member from the first rest position to the first operated position.

Also other objects, features, aspects and advantages of the disclosed bicycle operating device will become apparent to those skilled in the art from the following detailed description, which, taken in conjunction with the annexed drawings, discloses one illustrative embodiment of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
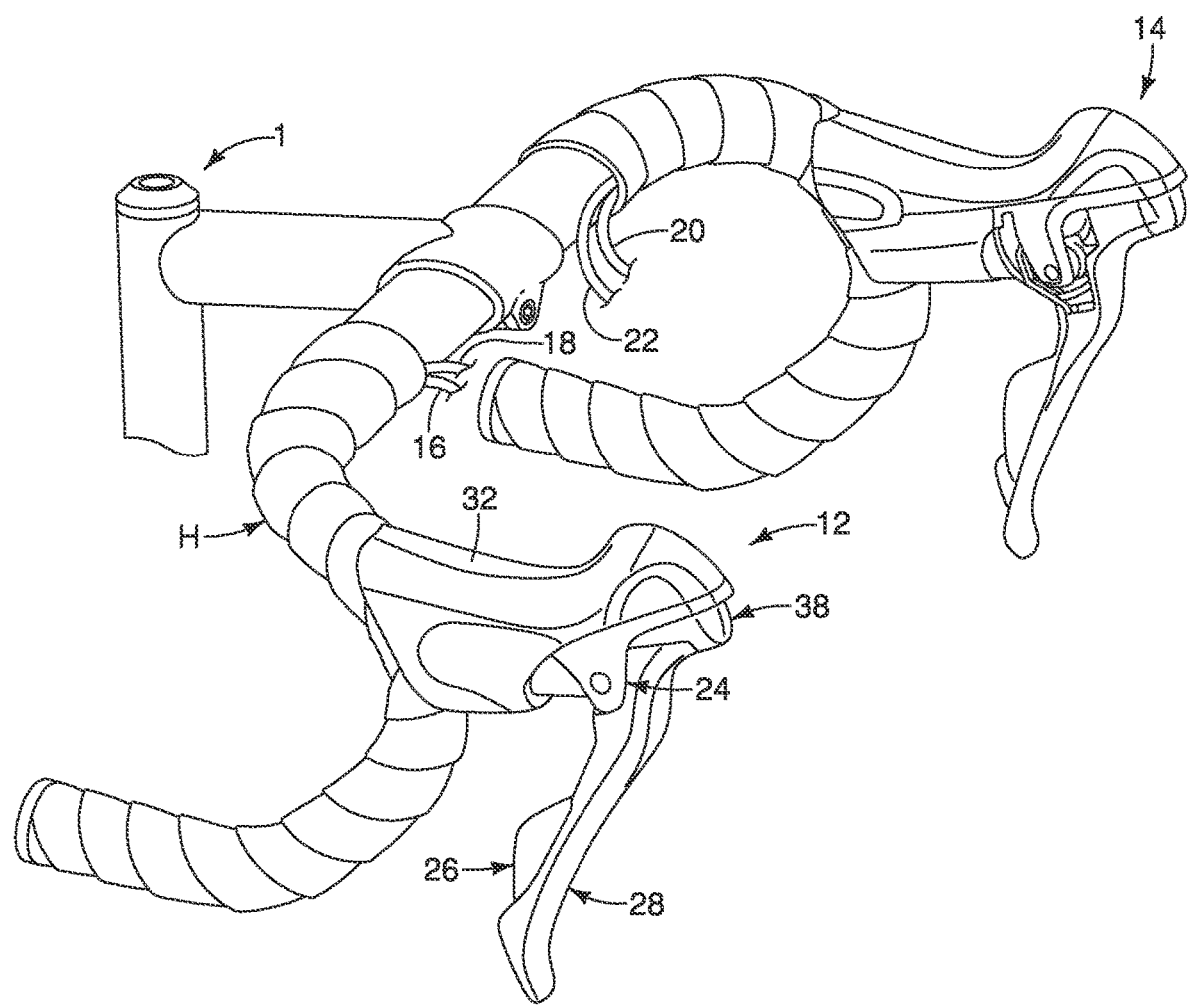
FIG. 1 is a front perspective view of a portion of a bicycle equipped with a pair of bicycle operating devices coupled to a drop handlebar in their installed positions with each of the bicycle operating devices in accordance with one illustrative embodiment.

Referring initially to FIG. 1, a portion of a bicycle 1 is illustrated that is equipped with a pair of bicycle operating devices 12 and 14 in accordance with one illustrative embodiment. The bicycle operating devices 12 and 14 are mounted on a drop handlebar H in accordance with the illustrated embodiment as seen in FIG. 1. The bicycle operating devices 12 and 14 are mounted to the downwardly curved portions of the drop down handlebar H.

The bicycle operating device 12 is a right hand side operating device operated by the rider's right hand to operate a first brake device (not shown) and a first shifting device (e.g., a cable operated rear derailleur). The bicycle operating device 14 is a left hand side operating device operated by the rider's left hand to operate a second brake device (not shown) and a second shifting device (e.g., a cable operated front derailleur). The first and second shifting devices are part of a conventional bicycle driving system that is used to change speed stages of the drive train in a relatively conventional manner. In the illustrated embodiment, the bicycle operating device 12 is operatively coupled to the first shifting device via a shift control cable 16 and to a brake device via a brake control cable 18. In the illustrated embodiment, the bicycle operating device 14 is operatively coupled to the second shifting device via a shift control cable 20 and to a brake device via a brake control cable 22.

Figure 2:
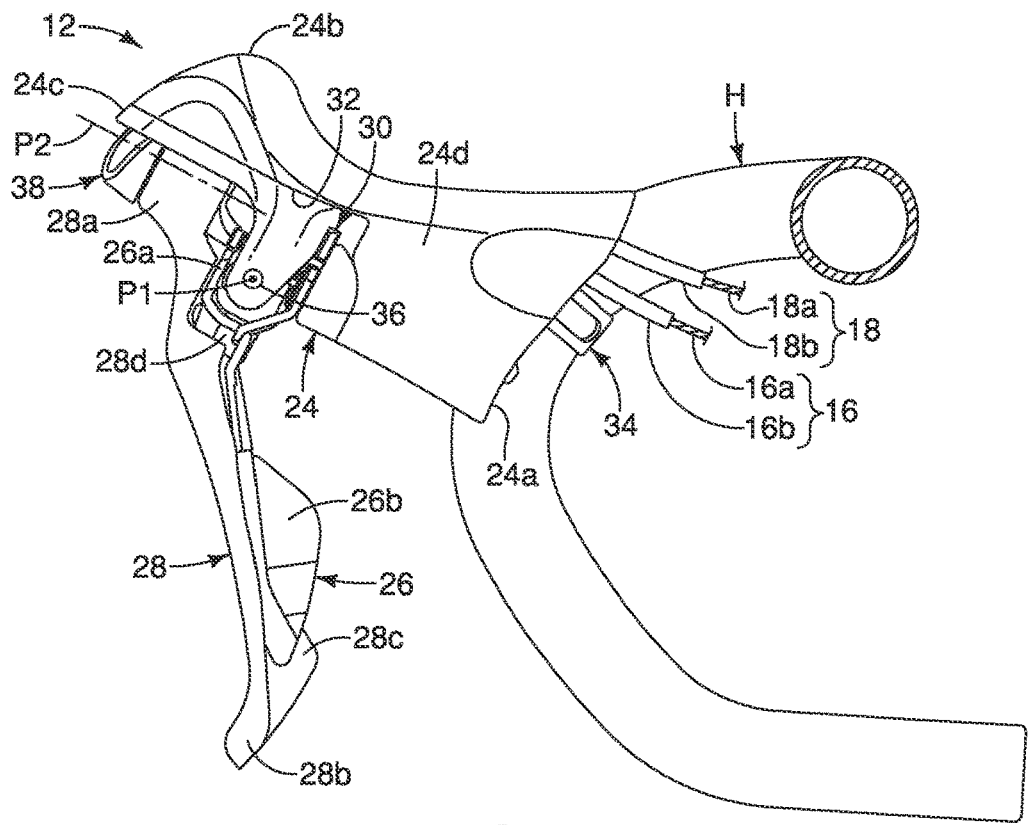
FIG. 2 is an inside elevational view of the right bicycle operating device illustrated in FIG. 1 with first and second operating members in their rest positions (non-actuated position)
Figure 3:
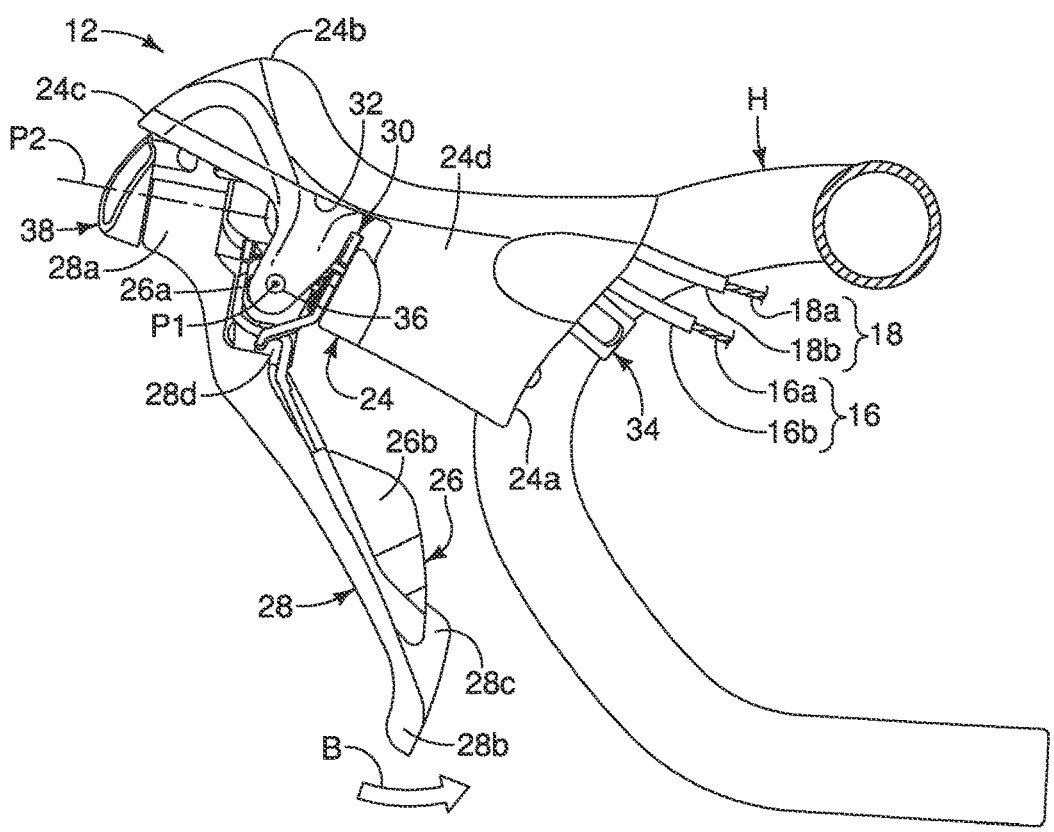
FIG. 3 is an inside elevational view, similar to FIG. 2, of the right bicycle operating device illustrated in FIGS. 1 and 2 with the first and second operating members moved rearwardly from their rest positions of FIG. 2.

As seen in FIGS. 2 and 3, preferably, the control cables 16, 18, 20 and 22 are conventional bicycle operating cables that have an outer case covering an inner wire. In other words, each of the control cables 16, 18, 20 and 22 are Bowden type cables basically include an inner wire slidably received within an outer case. For example, as seen in FIG. 3, the shift control cable 16 has an inner wire 16a with an outer case 16b covering the inner wire 16a, while the brake control cable 18 has an inner wire 18a with an outer case 18b covering the inner wire 18a. The inner wire 16a constitutes a connecting member that operatively connects the bicycle operating device 12 to the first shifting device for changing the speed stages in response to operation of the bicycle operating device 12. The inner wire 18a constitutes a connecting member that operatively connects the bicycle operating device 12 to the first brake device for applying a braking force to a wheel in response to operation of the bicycle operating device 12. The control cables 20 and 22 of the bicycle operating device 14 have the same construction as the control cables 16 and 18

While the bicycle operating devices 12 and 14 are illustrated as bicycle operating device that combine both shifting and braking using Bowden type cables, the bicycle operating devices 12 and 14 are not limited to a bicycle operating device that combine both shifting and braking using Bowden type cables. For example, the bicycle operating devices 12 and 14 can be configured for performing only shifting. Also the bicycle operating devices 12 and 14 can be configured for performing braking using a hydraulic operating unit. In the illustrated embodiment, the bicycle operating devices 12 and 14 are essentially identical in operation, except that they are mirror images of each other and they may have a different number of shifting operations. In other words, the bicycle operating device 14 is substantially identical to the bicycle operating device 12, except that the bicycle operating device 14 has been modified to be a mirror image and to decrease the number of gears that can be shifted. Thus, only the bicycle operating device 12 will be discussed and illustrated herein.

In this embodiment, as best seen in FIGS. 2 and 3, the bicycle operating device 12 basically includes a bracket 24, a first user operating lever 26, a second user operating lever 28. Further, the bicycle operating device 12 includes a bicycle component positioning unit 30, which is a shift unit in the illustrated embodiment. The first and second user operating levers 26 and 28 are pivots relative to the bracket 24 for performing shifting operations. In other words, the first and second user operating levers 26 and 28 are examples of user operated levers that are used for operating the bicycle component positioning unit 30 as discussed below. The second user operating lever 28 is also used for performing a braking operation as discussed below. Thus, the bicycle operating device 12 is often referred to as a road "brifter".

As seen in FIGS. 2 and 3, the bracket 24 constitutes a base member that pivotally supports the first and second user operating levers 26 and 28. The bicycle component positioning unit 30 is disposed an interior space or internal cavity of the bracket 24. Typically, the bracket 24 is made of a rigid, hard plastic material. Riders sometimes grip the bracket 24 and lean on the bracket 24 during riding. It is desirable to provide a comfortable feeling for the rider's hand while the rider is gripping the bracket 24. Thus, the bracket 24 has a rigid main body that is covered with a soft outer elastomeric grip cover 32. The grip cover 32 partially covers the bracket 24 as seen in FIGS. 2 and 3. In particular, the grip cover 32 is stretched over a gripping portion of the bracket 24. The precise construction of the bracket 24 depends on the construction of the bicycle component positioning unit 30, which can be a variety of types such a cable operated one as shown or an electrical one (not shown). The bracket 24 is sometimes formed as a one-piece member, while in other cases, the bracket 24 is formed a rigid main body part and one or more panel parts. Since a variety of shift units can be used for the bicycle component positioning unit 30 in the bicycle operating device 12, the precise construction of the bracket 24 will not be discussed herein.

The bracket 24 is provided with a handlebar mounting structure 34 at a rear end (proximal end) 24a for mounting to one of the downwardly curved portions of the drop handlebar H. The bracket 24 has an upwardly protruding portion (pommel portion) 24b at a front end (distal end) 24c. Riders grip between the proximal end 24a and the pommel portion 24b. In other words, the bracket 24 has a gripping portion 24d between the proximal end 24a and the pommel portion 24b. The bracket 24 is a stationary member when mounted to the drop handlebar H by the handlebar mounting structure 34. Since the bracket 24 is fixed to the drop handlebar H by the handlebar mounting structure 34, the bracket 24 constitutes a fixed member with respect to the drop handlebar H. The handlebar mounting structure 34 is preferably a conventional band clamp or similar structure that is used in a road shifter for gripping the drop handlebar H. Since the handlebar mounting structure 34 can be any suitable mounting structure, the handlebar mounting structure 34 will not be discussed or illustrated in detail herein.

Figure 4:
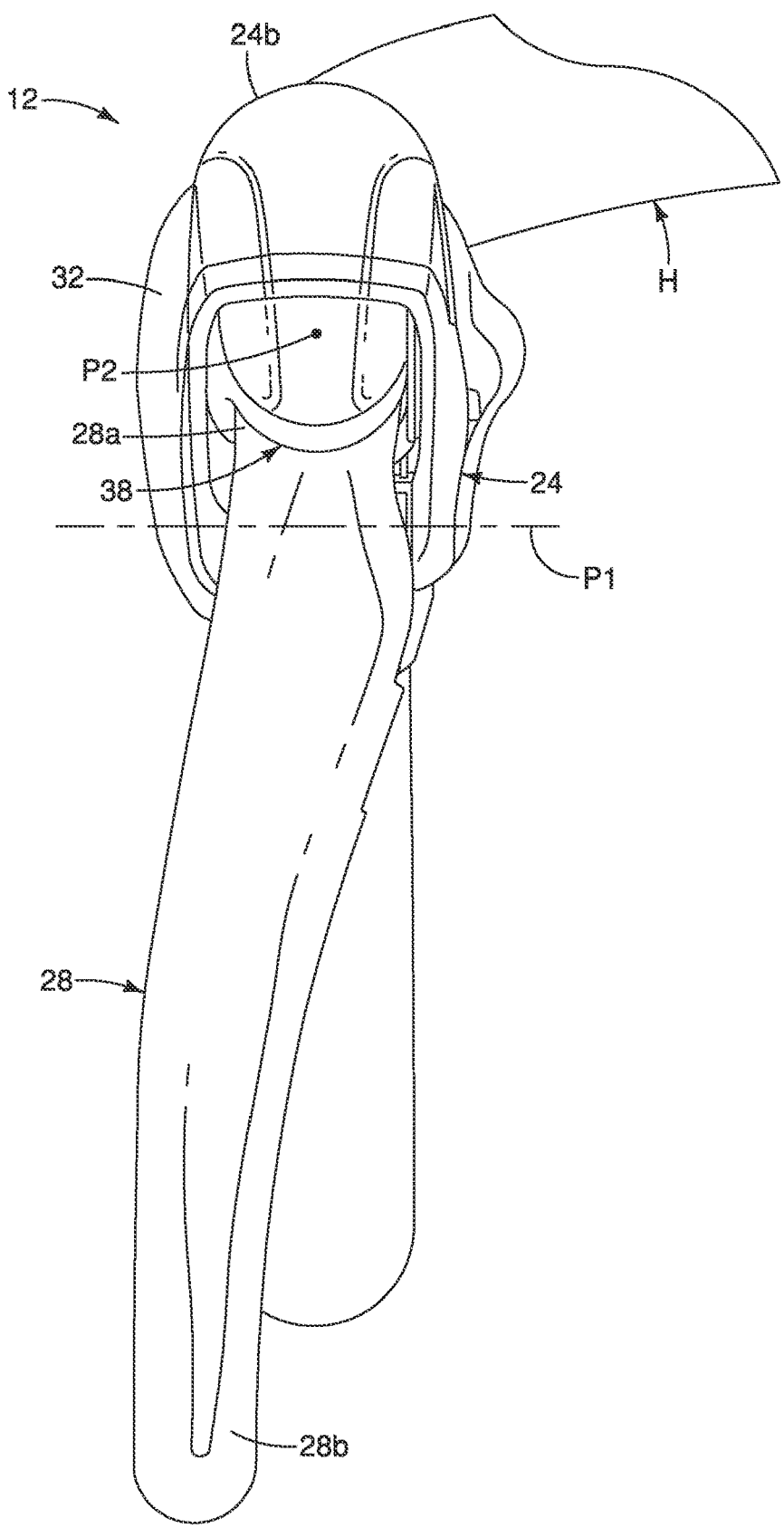
FIG. 4 is a front elevational view of the right bicycle operating device illustrated in FIGS. 1 to 3 with the first and second operating members in their rest positions.
Figure 5:
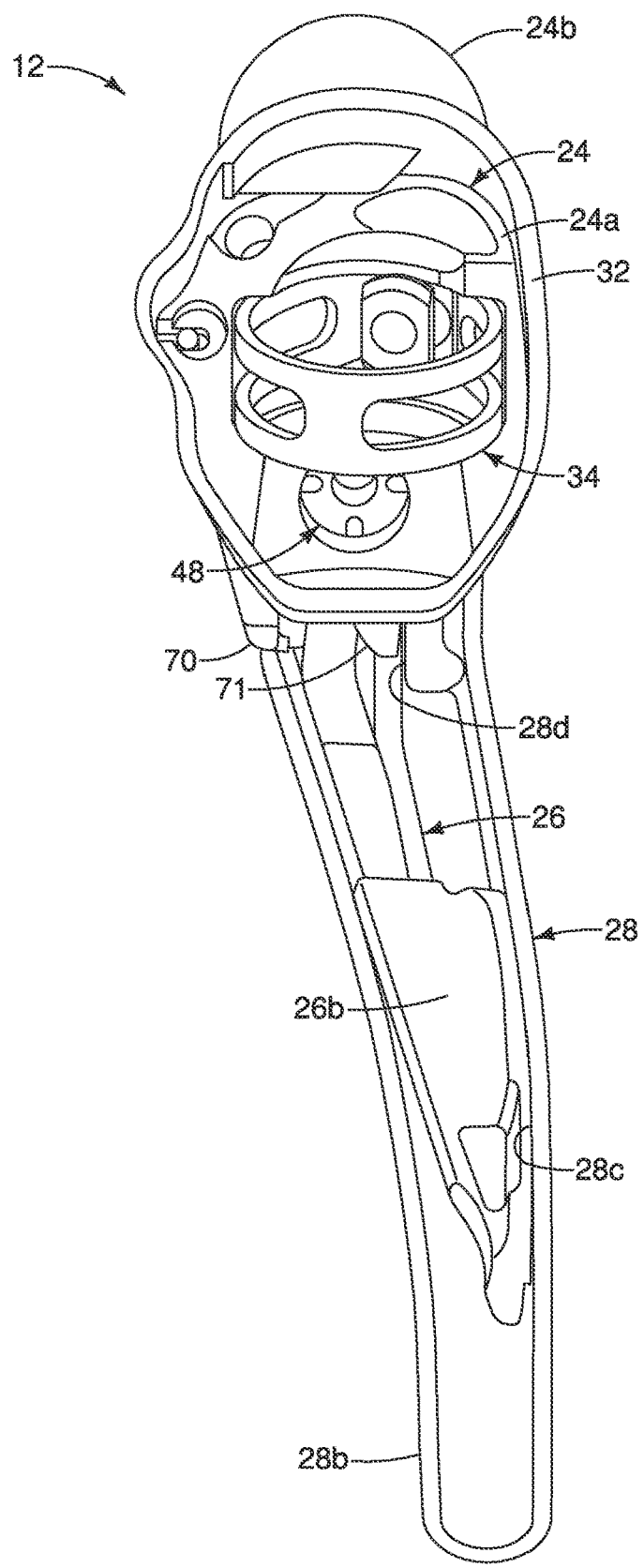
FIG. 5 is a rear elevational view of the right bicycle operating device illustrated in FIGS. 1 to 4 with the first and second operating members in their rest positions.
Figure 6:
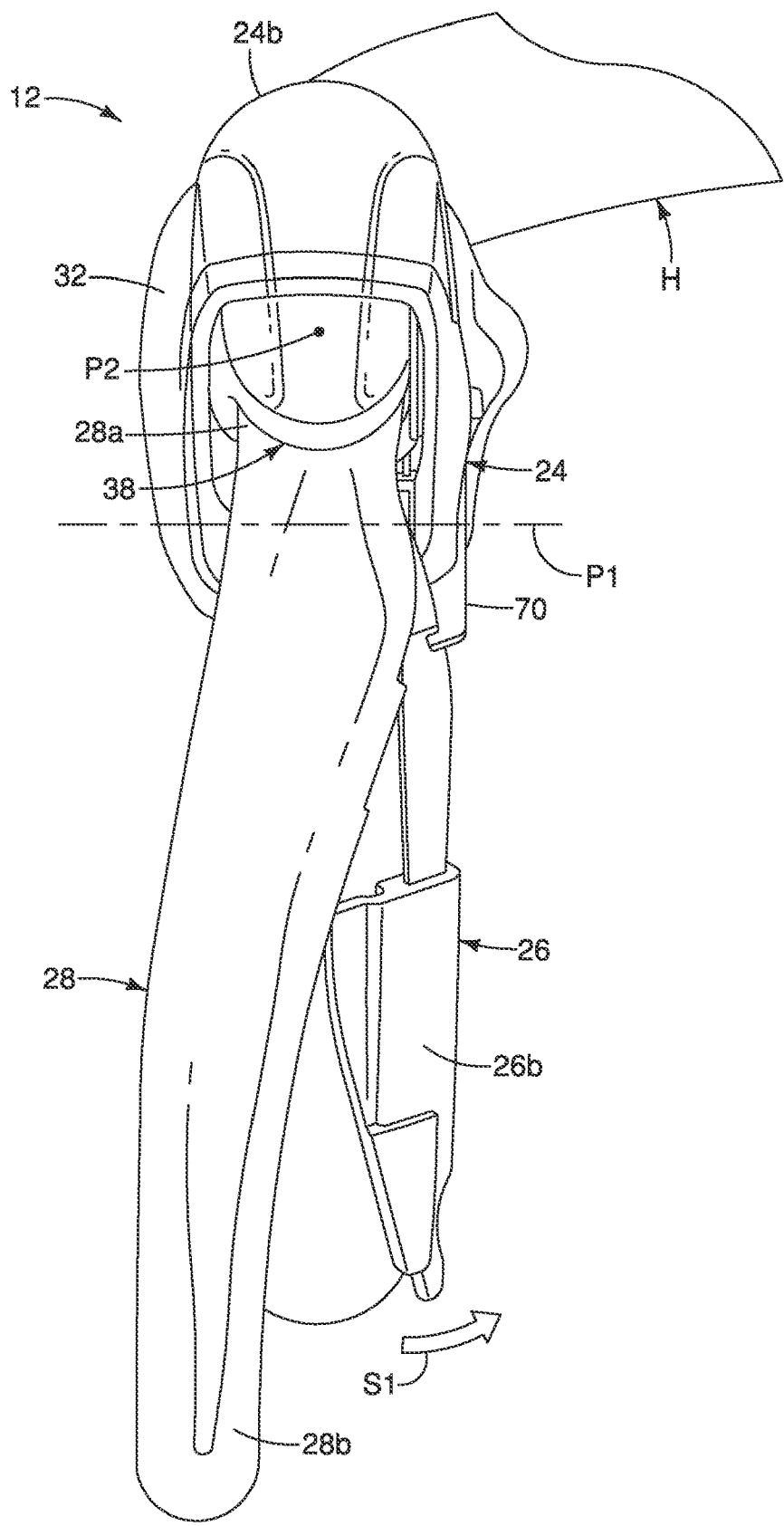
FIG. 6 is a front elevational view of the right bicycle operating device illustrated in FIGS. 1 to 5 with the first and second operating members in their rest positions.
Figure 7:
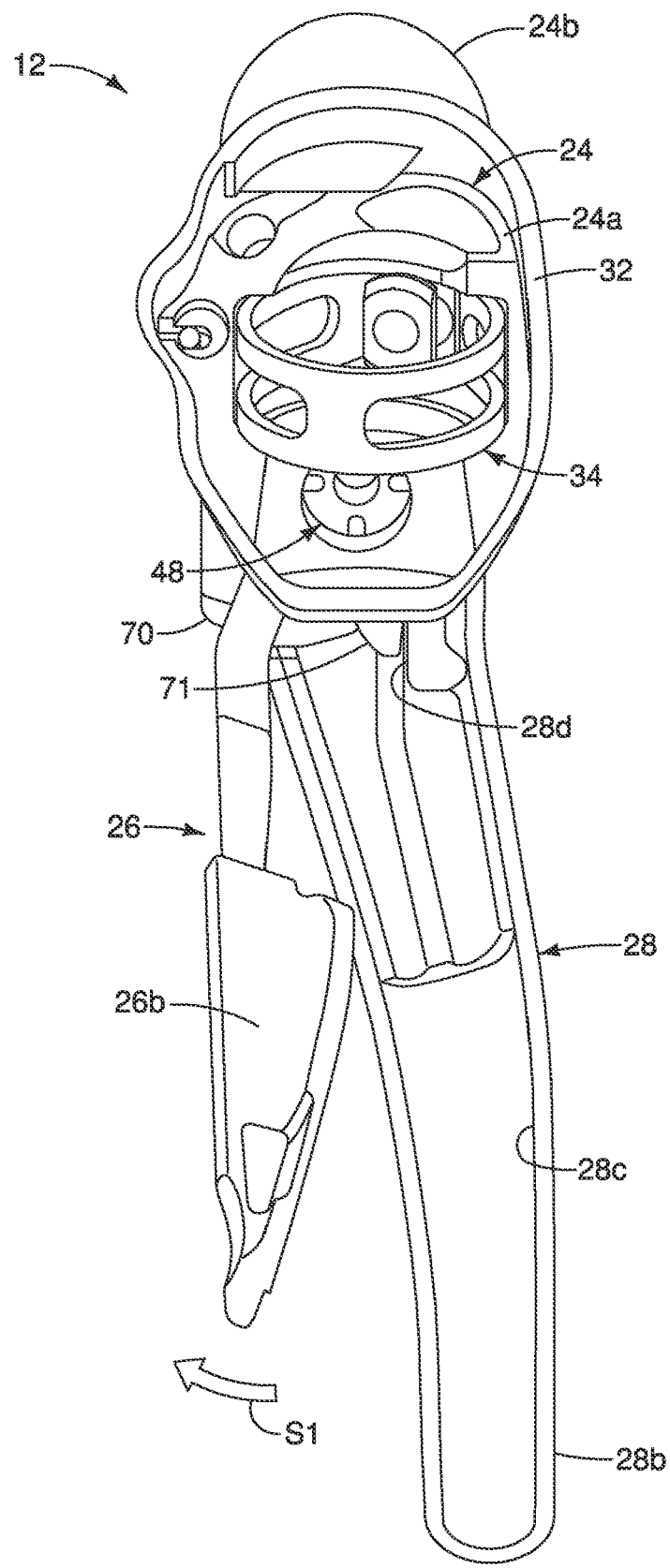
FIG. 7 is a rear elevational view of the right bicycle operating device illustrated in FIGS. 1 to 6 with the second operating member moved to a cable releasing position while the first operating member remains in the rest position.
Figure 8:
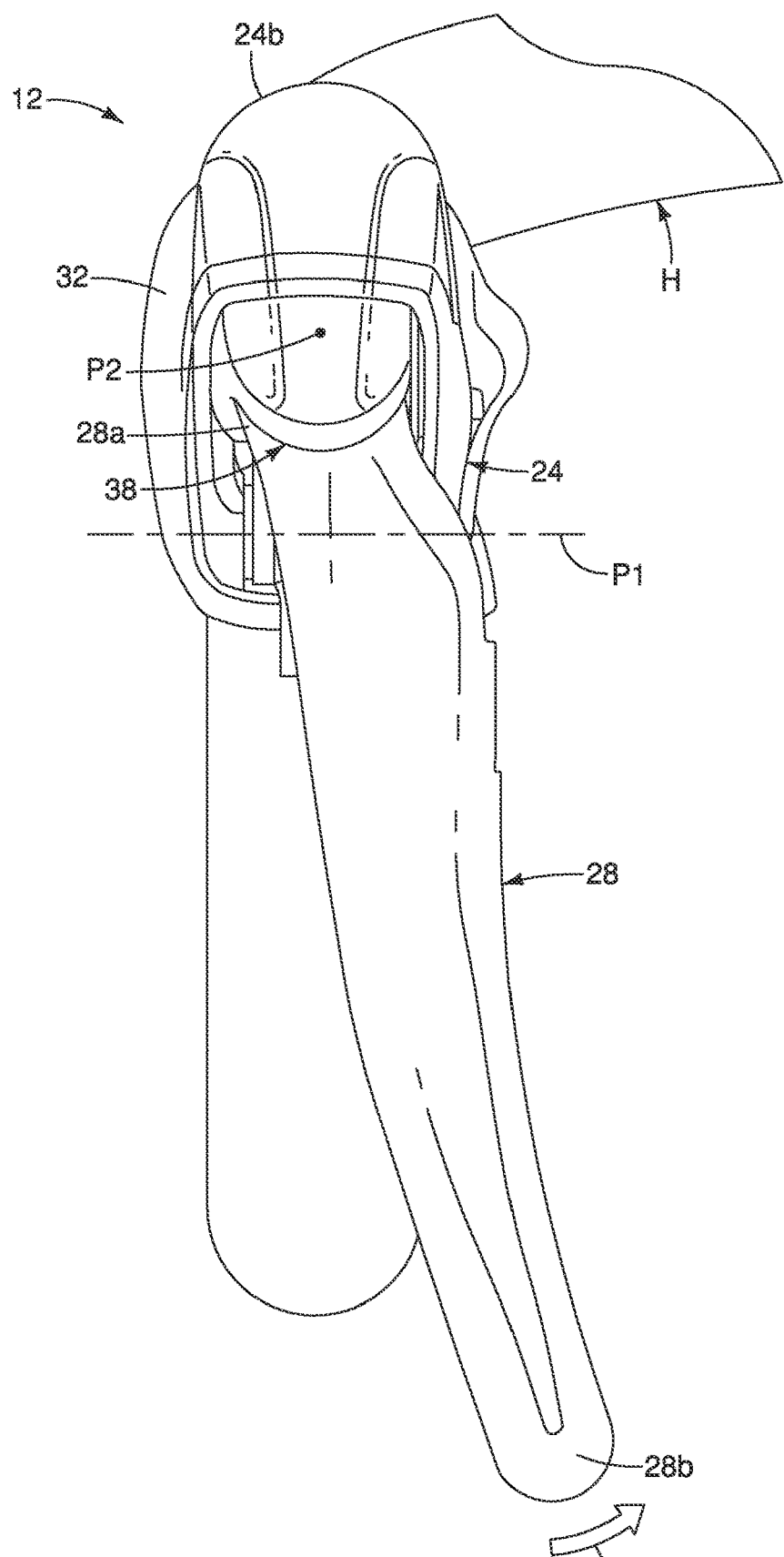
FIG. 8 is a front elevational view of the right bicycle operating device illustrated in FIGS. 1 to 7 with the first and second operating members moved to a cable pulling position as a result of the second operating member being operated.

In the illustrated embodiment, the first and second user operating levers 26 and 28 are trigger type levers that are biased to the rest positions in a conventional manner. FIGS. 2, 4 and 5 illustrate the first and second user operating levers 26 and 28 in their rest positions. FIGS. 3 and 6 illustrate the second user operating lever 28 in operated positions wherein the first user operating lever 26 is moves with the second user operating lever 28. FIGS. 7 and 8 illustrate the first user operating lever 26 in an operated position and the second user operating lever 28 in the rest positions. The term "rest position" as used herein refers to a state in which the part (e.g., the first and second user operating levers 26 and 28) remains stationary without the need of a user holding the part in that state corresponding to the rest position. The term "operated position" as used herein refers to a state in which the part (e.g., the first and second user operating levers 26 and 28) is temporarily held by an external force (e.g., a user holding the part in a state corresponding to the operated position).

As seen in FIGS. 2 and 3, the second user operating lever 28 is used to perform a braking operation. As seen in FIG. 3, the second user operating lever 28 is pivotally mounted relative to the bracket 24 by a pivot pin 36 that is mounted to the bracket 24. The pivot pin 36 defines a brake pivot axis P1 that extends transverse to the lateral surfaces of the bracket 24 to perform the braking operation. In the illustrated embodiment, the second user operating lever 28 is supported on a mounting member 38 that is pivotally attached to the bracket 24 by the pivot pin 36 that defines the brake pivot axis P1. As explained below, the second user operating lever 28 is also used to perform a shifting operation (e.g., a cable pulling operation). Thus, the second user operating lever 28 constitutes a user brake/shift operating lever.

Specifically, the rider pivots the second user operating lever 28 about the brake pivot axis P1 in a direction generally parallel to the bicycle longitudinal center plane for braking. This pivotal movement of the second user operating lever 28 from the rest position to the operated (braking) position along a non-shift operating path B (FIG. 3) pulls the inner wire 18a of the brake cable 18 to operate a brake device (not shown). The first user operating lever 26 is pivotally attached to the mounting member 38, and moves together with the second user operating lever 28 and the mounting member 38 as the second user operating lever 28 is operated to perform the braking operation as seen in FIGS. 2 and 3. Thus, the second user operating lever 28 functions as a brake lever.

As seen in FIGS. 5 to 7, the first user operating lever 26 is operatively coupled to the bicycle component positioning unit 30 for performing a shifting operation (i.e., a cable releasing operation). In the illustrated embodiment, the first user operating lever 26 is used to release the inner wire 16a from the bicycle component positioning unit 30 when the first user operating lever 26 is pivoted about the shift pivot axis P2 in a direction S1 towards the center longitudinal plane of the bicycle 10. Thus, the first user operating lever 26 constitutes as a cable releasing lever. The first user operating lever 26 only performs shifting operations. FIG. 5 illustrates the first user operating lever 26 in the rest position, while FIGS. 6 and 7 illustrate the first user operating lever 26 in a shift operated position. In particular, the first user operating lever 26 is pivotally mounted on the second user operating lever 28 such that the first user operating lever 26 pivots relative to the second user operating lever 28 about the shift pivot axis P2 (see FIG. 6) between the rest position and the shifting position. The second user operating lever 28 remains stationary or substantially stationary while the first user operating lever 26 is pivoted about the shift pivot axis P2.

As seen in FIG. 8, the second user operating lever 28 pivots relative to the bracket 24 along a plane that is transverse to a braking plane of the second user operating lever 28 to perform a shifting operation. The shift pivot axis P2 is non coaxial with respect to the brake pivot axis P1. Specifically, the rider pivots the second user operating lever 28 about the shift pivot axis P2 in a direction S2 towards a bicycle longitudinal center plane for shifting. This pivotal movement of the second user operating lever 28 from the rest position to the shift operated position pulls the inner wire 16a of the shift cable 16. Thus, the second user operating lever 28 functions as a cable pulling lever. The first user operating lever 26 moves together with the second user operating lever 28 as the second user operating lever 28 is operated to perform the shifting operation as seen in FIG. 8. In particular, during a shifting operation using the second user operating lever 28, the second user operating lever 28 contacts the first user operating lever 26 during pivotal movement of the second user operating lever 28 about the shift pivot axis P2 so that the first and second user operating levers 26 and 28 move together. However, the first user operating lever 26 does not operate the bicycle component positioning unit 30 when the second user operating lever 28 is pivoted about the shift pivot axis P2 to perform the shifting operation.

Figure 9:
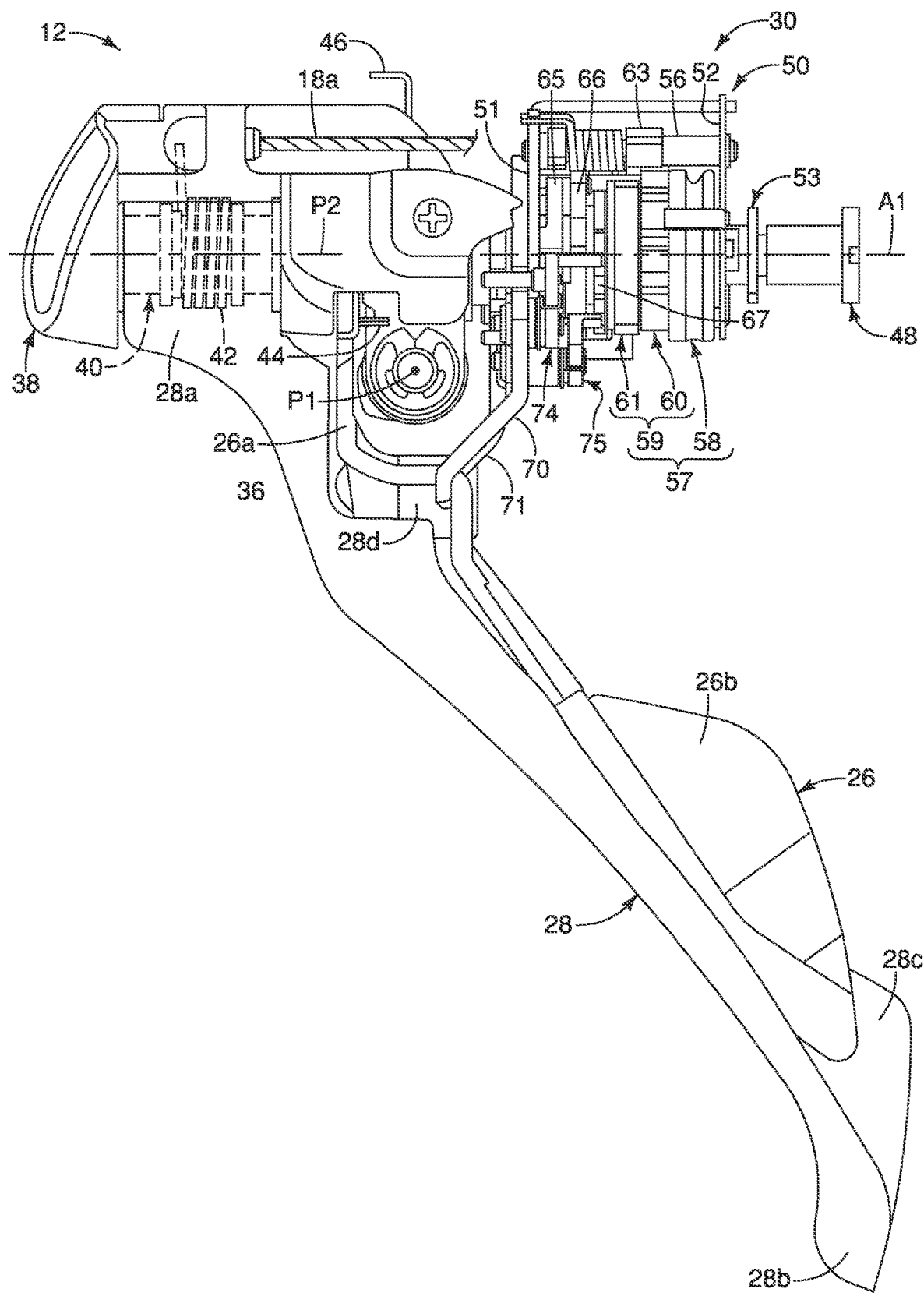
FIG. 9 is an inside elevational view of the right bicycle operating device illustrated in FIGS. 1 to 8 with selected parts removed to reveal a bicycle component positioning unit (shift unit) of the right bicycle operating device.

As seen in FIG. 9, the first and second user operating levers 26 and 28 are movably supported on the mounting member 38. In particular, the first user operating lever 26 also has a mounting end 26a that is pivotally attached to the mounting member 38 by a pivot axle structure 40. The second user operating lever 28 has a mounting end 26a that is pivotally attached to the mounting member 38 by a pivot axle structure 40. The pivot axle structure 40 is disclosed in detail in U.S. Pat. No. 9,056,597, which is assigned to Shimano Inc.

The first user operating lever 26 has a user operating portion 26b that is disposed outside of the bracket 24 for the rider to pivot the first user operating lever 26 about the shift pivot axis P2. Similarly, the second user operating lever 28 has a user operating portion 28b that is disposed outside of the bracket 24 for the rider to pivot the second user operating lever 28 about the shift pivot axis P2. The second user operating lever 28 has an abutment 28c that contacts the first user operating lever 26 when the second user operating lever 28 is pivoted about the shift pivot axis P2 to perform the shifting operation. In this way, the first user operating lever 26 is pivoted by the second user operating lever 28 when the second user operating lever 28 is pivoted about the shift pivot axis P2 to perform a shifting operation. The second user operating lever 28 also has an abutment 28d that abuts a part of the bicycle component positioning unit 30 to operate the bicycle component positioning unit 30 as explained later.

As seen in FIG. 9, the mounting member 38 has a cable attachment hole 38c for attaching the inner wire 18a of the brake control cable 18. The pivot pin 36 is located in holes of pivot attachment portions of the bracket 24 and the mounting member 38 such that the inner wire 18a of the brake control cable 18 is pulled as the second user operating lever 28 pivoted on the pivot pin 36 from the rest position (FIG. 2) to the braking position (FIG. 3). A biasing element (not shown) is provided on the pivot pin 36 for biasing the mounting member 38 and the second user operating lever 28 to the rest position as position (FIG. 2) with respect to the bracket 24. In the illustrated embodiment, the biasing element for biasing the mounting member 38 and the second user operating lever 28 is a torsion spring with its coiled portion disposed on the pivot pin 36, a first free end contacting the bracket 24 and a second free end contacting the mounting member 38.

As seen in FIG. 9, a biasing member 42 is provided between the first user operating lever 26 and the mounting member 38. The biasing member 42 is arranged for biasing the first user operating lever 26 relative to the second user operating lever 28 about the shift pivot axis P2 toward the rest position. In the illustrated embodiment, the biasing member 42 is a torsion spring that is disposed on the pivot axle structure 40. In the illustrated embodiment, the biasing member 42 has a first free end portion that is disposed in a hole of the first user operating lever 26, and a second free end portion that contacts the mounting member 38. The biasing element 42 has its coiled portion disposed on a lever attachment portion of the pivot axle structure 40.

Similarly, as seen in FIG. 9, a biasing member 44 is provided between the second user operating lever 28 and the mounting member 38. The biasing member 44 biases the second user operating lever 28 relative to the mounting member 38 about the shift pivot axis P2 toward a rest position. In the illustrated embodiment, the biasing member 44 is a torsion spring that is disposed on a center section of the pivot axle structure 40. More specifically, the biasing member 44 has a first free end portion that is disposed in a hole of the second user operating lever 28, and a second free end portion that is disposed in a hole of the mounting member 38. The biasing member 44 has its coiled portion disposed on the pivot axle structure 40.

As seen in FIG. 9, the bicycle component positioning unit 30 is mounted to the bracket 24 by a mounting hanger 46 and a mounting bolt 48. The mounting hanger 46 supports the front end of the bicycle component positioning unit 30, while the mounting bolt 48 supports the rear end of the bicycle component positioning unit 30. The mounting hanger 46 is attached to the bracket 24 by a screw (not shown) that is threaded into the bracket 24. The mounting bolt 48 extends through a hole in the rear end of the bracket 24, and is threaded into the bicycle component positioning unit 30. With this attachment arrangement, the bicycle component positioning unit 30 is mounted on the bracket 24 such that the bicycle component positioning unit 30 that is detachable from the bracket 24 as an integrated unit.

Referring now to FIGS. 10 to 26, the bicycle component positioning unit 30 of the bicycle operating device 12 will now be discussed in more detail. In the illustrated embodiment, the bicycle component positioning unit 30 is a cable operated unit. More specifically, the bicycle component positioning unit 30 is a shift unit that pulls and releases the inner wire 16a such that the inner wire 16a is selectively held in one of a plurality of predetermined positions. However, it will be apparent from this disclosure that the bicycle component positioning unit 30 can be used in other bicycle component operating devices such as a bicycle suspension operating device. Moreover, it will be apparent from this disclosure that the bicycle component positioning unit 30 can be used in non-cable operating devices if needed and/or desired.

In the illustrated embodiment, as seen in FIGS. 10 to 14, the bicycle component positioning unit 30 of the bicycle operating device 12 comprises a support structure 50 that supports the various parts of the bicycle component positioning unit 30 on the bracket 24 of the bicycle operating device 12. In the illustrated embodiment, the support structure 50 includes a first stationary support plate 51 and a second stationary support plate 52, a main support axle 53, an axle nut 54 and a pair of secondary support axles 55 and 56. Thus, the support structure 50 constitutes a fixed member of the bicycle component positioning unit 30. Of course, it will be apparent from this disclosure that the fixed member is not limited to the support structure 50 of the illustrated embodiment. Moreover, each of the parts of the support structure 50 can be individually considered to be a fixed member of the bicycle component positioning unit 30. In other words, the parts of the bicycle operating device 12 that are stationary with respect to the parts of the bicycle component positioning unit 30 are each considered to be a fixed member.

The first and second stationary support plates 51 and 52 are non-rotatably supported on the main support axle 53. The first and second stationary support plates 51 and 52 are preferably rigid members that are made of a suitable material such as a metallic material. The first and second stationary support plates 51 and 52 are spaced apart and coupled together by the main support axle 53 and the secondary support axles 55 and 56

The main support axle 53 is a bolt that has a head at one end and a shaft that is threaded at the end opposite to the head. In particular, the head of the main support axle 53 abuts against the first stationary support plate 51 with an anti-rotation structure formed therebetween. The mounting hanger 46 has a lower opening that receives the shaft of the main support axle 53 therethrough. The axle nut 54 is screwed onto a threaded end of the shaft of the main support axle 53 for securing the mounting hanger 46 to the main support axle 53, and for holding the various parts of the bicycle component positioning unit 30 together on the main support axle 53. The mounting bolt 48 is screwed into a threaded hole formed in the head of the main support axle 53. In this way, the bicycle component positioning unit 30 is detachably secured to the bracket 24 by the mounting hanger 46 at the front end and detachably secured to the bracket 24 by the mounting bolt 48 at the rear end.

The main support axle 53 is also provided with various spacers and bushings for properly spacing and rotatably supporting various parts of the bicycle component positioning unit 30. Since the spacers and bushings are conventional parts that are typically found in bicycle component positioning unit 30, these spacers and bushings of the bicycle component positioning unit 30 will not be discussed and/or illustrated herein.

Figure 10:
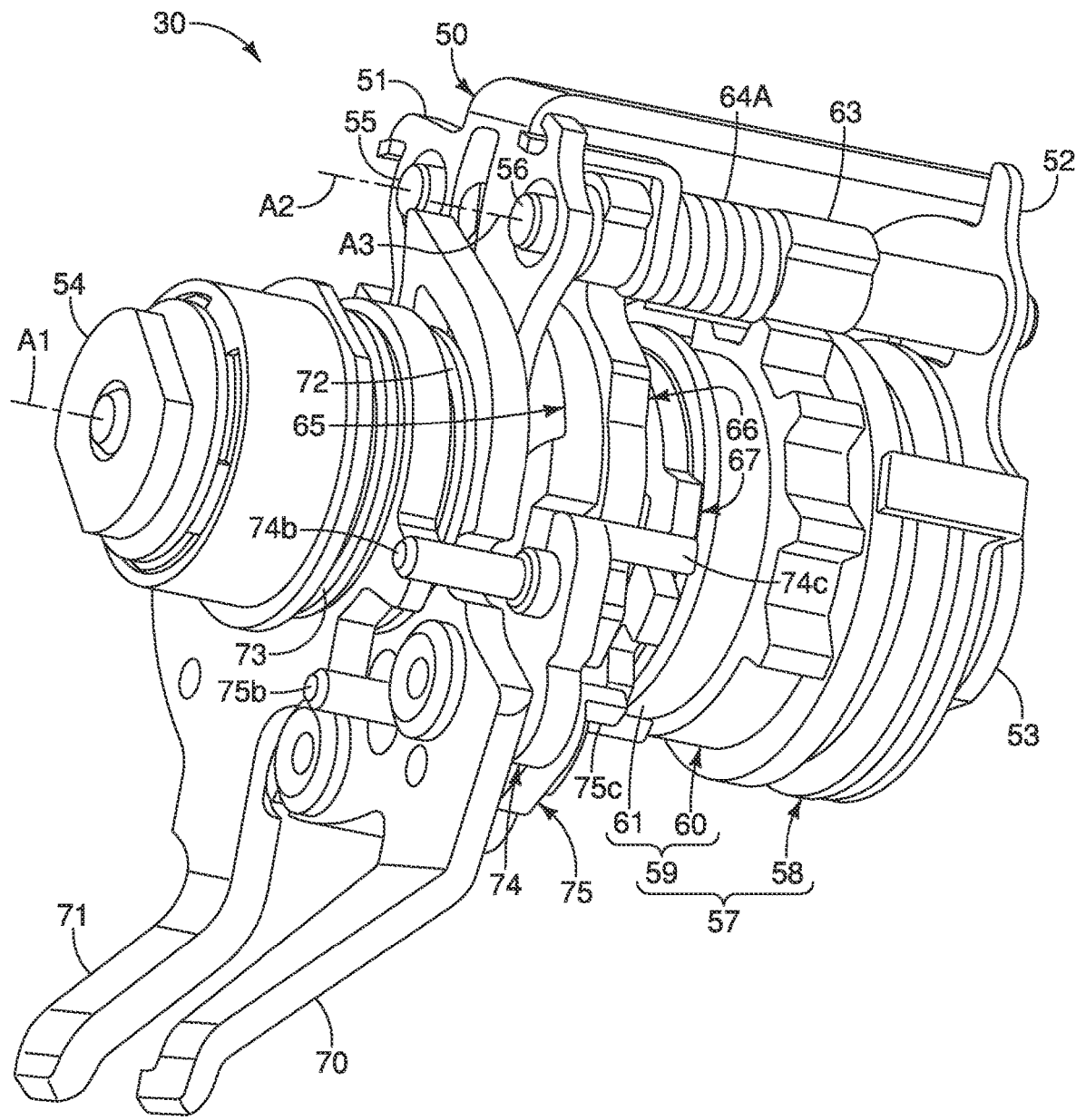
FIG. 10 is a first front perspective view of the bicycle component positioning unit (shift unit) illustrated in FIG. 9 with the parts in their rest positions.

As seen in FIG. 10, the main support axle 53 defines a rotational axis A1 of the bicycle component positioning unit 30. The secondary support axle 55 defines a pivot axis A2, while the secondary support axle 56 defines a pivot axis A3. The pivot axes A2 and A3 are offset and parallel to the rotational axis A1.

The bicycle component positioning unit 30 of the bicycle operating device 12 comprises a control body 57 for releasing and pulling the inner wire 16a to operate a bicycle component in response to operation of the first and second user operating levers 26 and 28. The control body 57 is rotatably supported on the support structure 50 about the rotational axis A1. As explained later, the control body 57 rotates in a first direction D1 about the rotational axis A1 as the first user operating lever 26 moves from its rest position to its operated position. On the other hand, the control body 57 rotates in a second direction D2 about the rotational axis A1 as the second user operating lever 28 moves from its rest position to its operated position. The second direction D2 is opposite to the first direction D1 with respect to the rotational axis A1.

While the bicycle component positioning unit 30 is shown as a rotary movement design, it will be apparent that the bicycle component positioning unit 30 can be configured as a linear movement design if needed and/or desired. However, the rotary movement design of the bicycle component positioning unit 30 of the illustrated embodiment provides for a compact design that is desirable in a drop handlebar type of road shifter.

Figure 14:
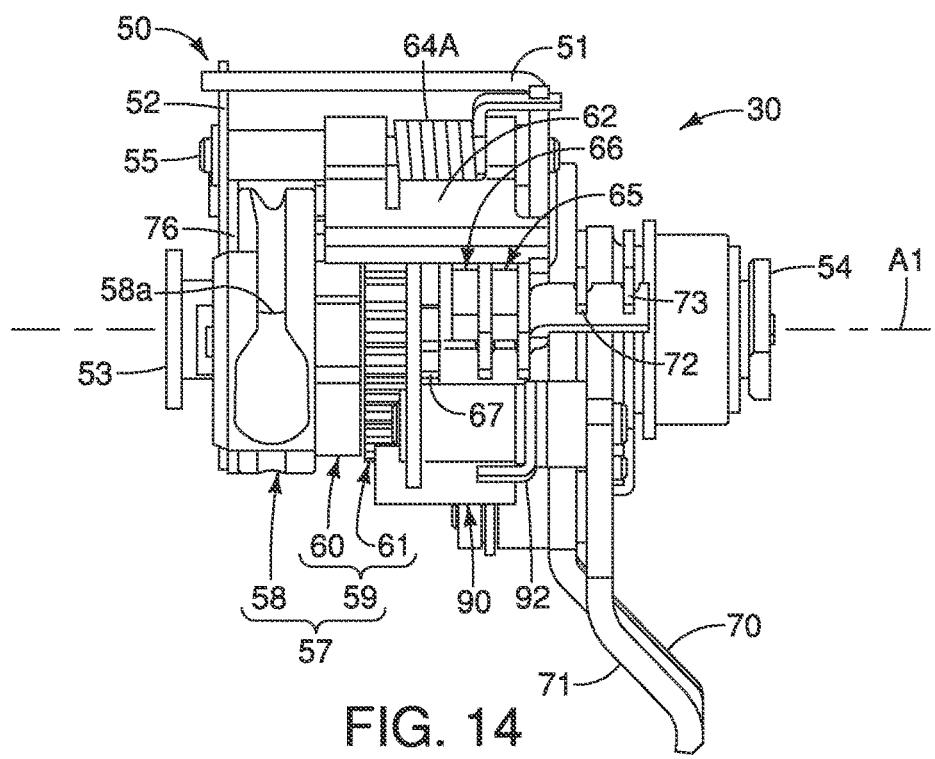
FIG. 14 is a second side perspective view of the bicycle component positioning unit illustrated in FIGS. 9 to 13 with the parts in their rest positions.
Figure 15:
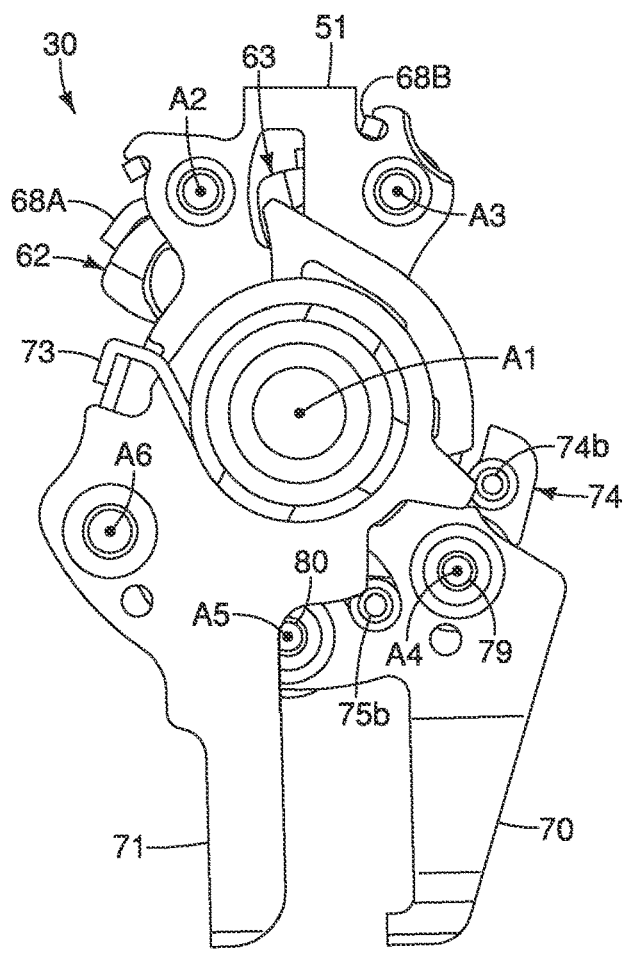
FIG. 15 is a front elevational view of a selected parts of the bicycle component positioning unit illustrated in FIGS. 9 to 14 with the selected parts in their rest positions.

In the illustrated embodiment, as seen in FIG. 14, the control body 57 includes a wire take-up member 58 having an inner wire connection structure 58a. The control body 57 also includes a positioning member 59 that is non-movably coupled to the wire take-up member 58. In the illustrated embodiment, the positioning member 59 includes a positioning ratchet 60 and a pulling ratchet 61. While the positioning ratchet 60 and the pulling ratchet 61 are separate pieces, it will be apparent from this disclosure that the positioning ratchet 60 and the pulling ratchet 61 can be integral formed as a one-piece or unitary member.

The bicycle component positioning unit 30 of the bicycle operating device 12 further comprises a first maintaining member 62 and a second maintaining member 63. The first maintaining member 62 is movably supported by the support structure 50 to selectively move from a first maintaining position to a first non-maintaining position. In particular, the first maintaining member 62 is pivotally supported on the secondary support axle 55. In the illustrated embodiment, the first maintaining member 62 includes a first maintaining pawl that is biased towards the first maintaining position. The first maintaining member 62 is biased by a biasing element 64A towards the first maintaining position. The biasing element 64A is a torsion spring that has its coiled portion mounted on the secondary support axle 55. A first free end portion of the biasing element 64A engages the first stationary support plate 51, while a second free end portion of the biasing element 64A engages the first maintaining member 62. In this way, the first maintaining member 62 is biased about the pivot axis A2 by the biasing element 64A towards the positioning ratchet 60. The second maintaining member 63 is movably supported by the support structure 50 to selectively move from a second maintaining position to a second non-maintaining position. In particular, the second maintaining member 63 is pivotally supported on the secondary support axle 56. In the illustrated embodiment, the second maintaining member 63 includes a second maintaining pawl. The second maintaining member 63 is biased by a biasing element 64B towards the second maintaining position. The biasing element 64B is a torsion spring that has its coiled portion mounted on the secondary support axle 56. A first free end portion of the biasing element 64B engages the first stationary support plate 51, while a second free end portion of the biasing element 64B engages the second maintaining member 63. In this way, the second maintaining member 63 is biased about the pivot axis A3 by the biasing element 64B towards the positioning ratchet 60. As explained later, the first and second maintaining members 62 and 63 cooperate with the positioning ratchet 60 to selective establish a plurality of predetermined positions of the wire take-up member 58 in response to operation of the first and second user operating levers 26 and 28.

Figure 18:
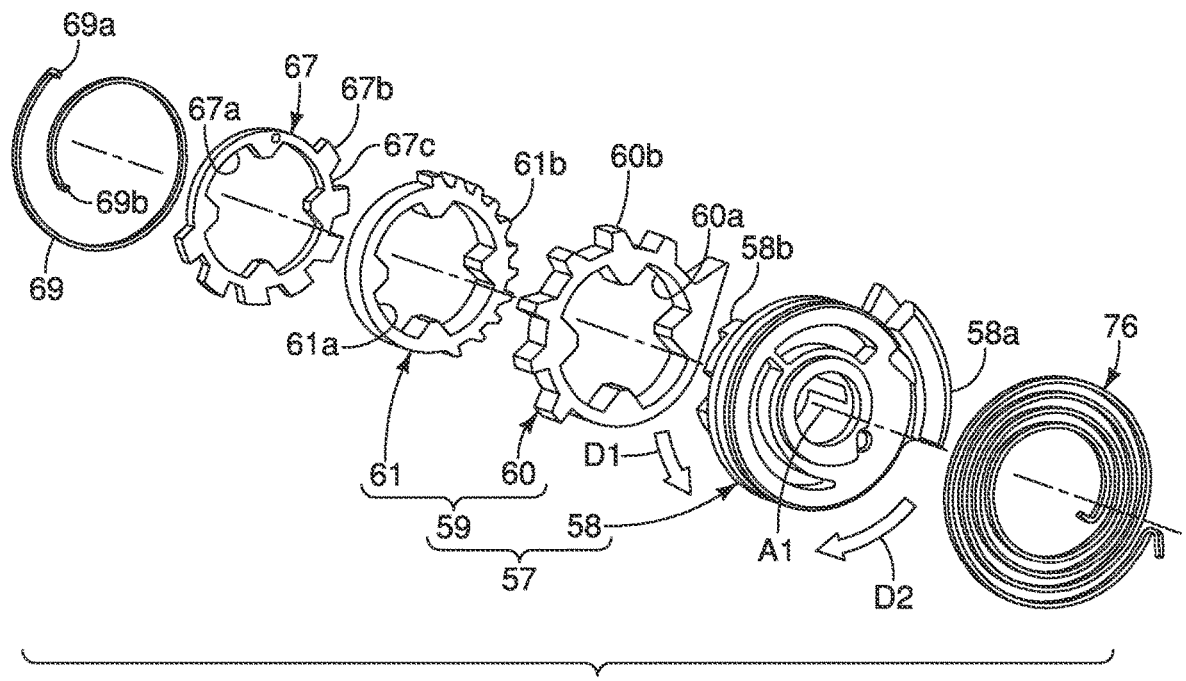
FIG. 18 is a partially exploded, rear perspective view of selected parts of the bicycle component positioning unit illustrated in FIGS. 9 to 14 as viewed from the rear of the bicycle component positioning unit.
Figure 19:
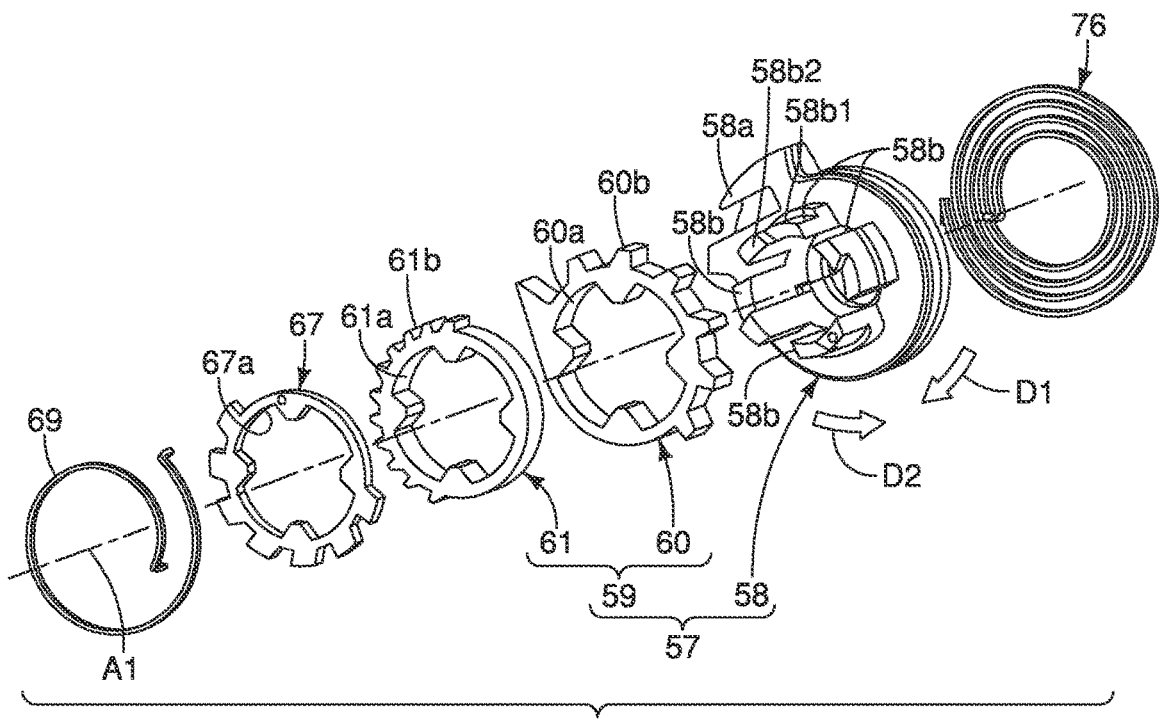
FIG. 19 is a partially exploded, rear perspective view of the selected parts of the bicycle component positioning unit illustrated in FIG. 19 as viewed from the front of the bicycle component positioning unit.
Figure 20:
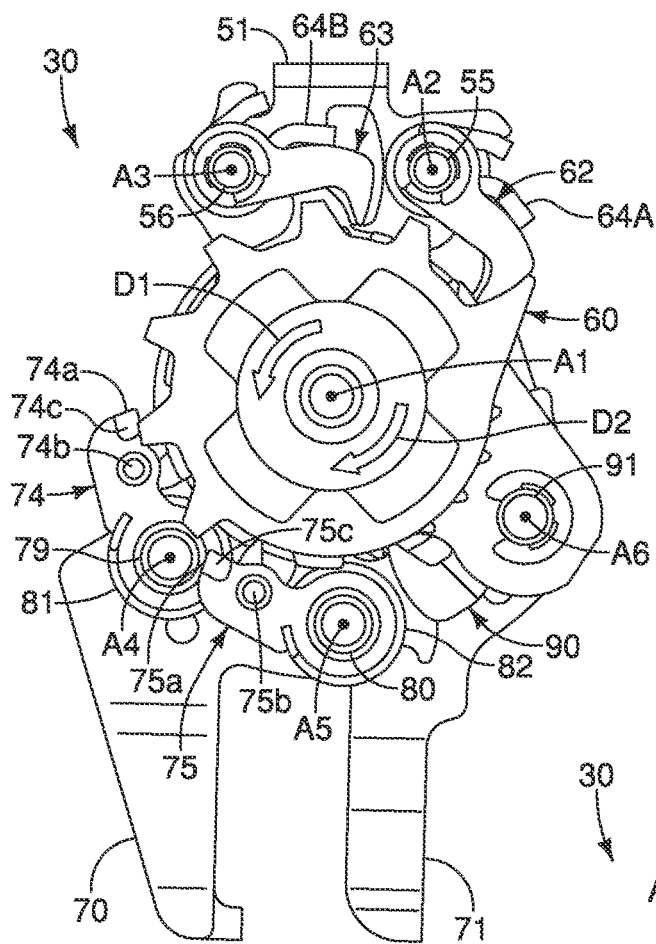
FIG. 20 is a rear elevational view of selected parts of the bicycle component positioning unit illustrated in FIGS. 9 to 14 with the selected parts in their rest positions.
Figure 21:
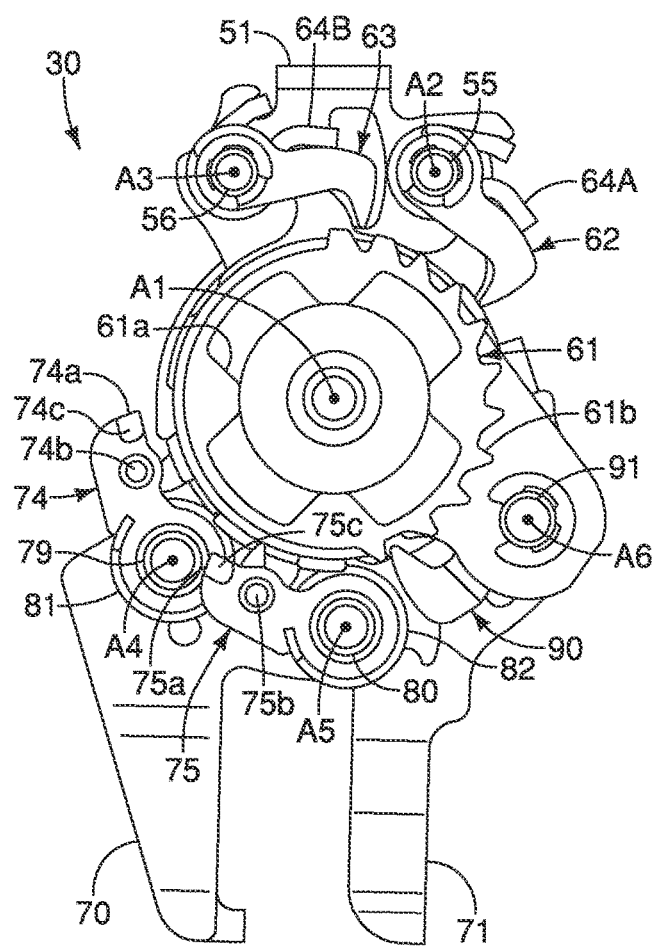
FIG. 21 is a rear elevational view, similar to FIG. 20, of the selected parts of the bicycle component positioning unit illustrated in FIG. 20 but with the positioning ratchet of the positioning member removed.

As best seen in FIGS. 18 and 19, the positioning ratchet 60 is a ring shaped member having a non-circular opening 60a for non-rotatably engaging a four arc-shaped projections 58b of the wire take-up member 58. In this way, the positioning ratchet 60 is non-rotatably coupled to the wire take-up member 58 so that the wire take-up member 58 and the positioning ratchet 60 rotate together as a unit about the rotational axis A1 defined by the main support axle 53. The peripheral edge of the positioning ratchet 60 is provided with a plurality of positioning teeth 60b. In this way, the positioning ratchet 60 of the positioning member 59 includes the plurality of positioning teeth 60b that define a plurality of predetermined positions of the wire take-up member 58. More particularly, one at a time, the first and second maintaining members 62 and 63 selectively engage one of the positioning teeth 60b to establish one of the plurality of predetermined positions of the wire take-up member 58. The first maintaining pawl of the first maintaining member 62 is biased towards the first maintaining position to selectively engage one of the positioning teeth 60b. The second maintaining pawl of the second maintaining member 62 is biased towards the second maintaining position to selectively engage one of the positioning teeth 60b.

As best seen in FIGS. 18 and 19, the pulling ratchet 61 is a ring shaped member having a non-circular opening 61a for non-rotatably engaging the four arc-shaped projections 58b of the wire take-up member 58. In this way, the pulling ratchet 61 is non-rotatably coupled to the wire take-up member 58 so that the wire take-up member 58 and the pulling ratchet 61 rotate together as a unit about the rotational axis A1 defined by the main support axle 53. The peripheral edge of the pulling ratchet 61 is provided with a plurality of pulling teeth 61b. In this way, the pulling ratchet 61 of the positioning member 59 includes the plurality of pulling teeth 61b. As explained later, the pulling teeth 61b are engaged to rotate the wire take-up member 58 in the second direction D2 about the rotational axis A as the second user operating lever 28 moves from its rest position to its operated position.

The bicycle component positioning unit 30 of the bicycle operating device 12 further comprises a first release member 65, a second release member 66 and a select member 67. The first release member 65, the second release member 66 and the select member 67 are all rotatably supported on the support structure 50 about the rotational axis A1. Basically, the first and second release members 65 and 66 have similar structures and similar functions. Thus, in view of these similarities, the similar parts or portions of the first and second release members 65 and 66 will be designated as "first" when referring to the parts or portions of the first release member 65, and designated as "second" when referring to the parts or portions of the second release member 66.

As explained later, the first release member 65 is selectively moved to disengage the first maintaining member 62 from the positioning ratchet 60 to release the wire take-up member 58 in response to operation of the first user operating lever 26 from a rest position to a fully operated position. On the other hand, the second release member 66 is selectively moved to disengage the second maintaining member 63 in response to operation of the first user operating lever 26 from a partially operated position to a fully operated position. The select member 67 is arranged to allow the first and second release members 65 and 66 to be alternately moved for achieving a compact and quick release of the wire take-up member 58 in response to operation of the first user operating lever 26 as explained below.

Figure 31:
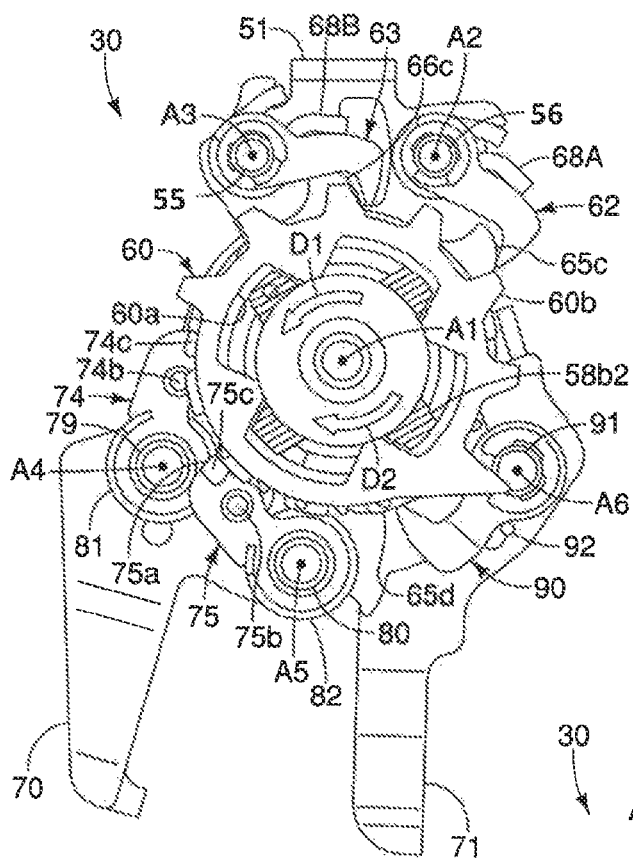
FIG. 31 is a rear elevational view, similar to FIGS. 27 and 29, of the selected parts of the bicycle component positioning unit illustrated in FIGS. 27 to 30 but with the first operating member moved farther from the position illustrated in FIGS. 29 and 30 to rotate the first release member and the select member by the first release pawl and move the first maintaining member out of engagement with the positioning ratchet of the positioning member, while the second release pawl remains in contact with the select member, which prevents the second release pawl from engages a second pawl contact of the second release member.
Figure 32:
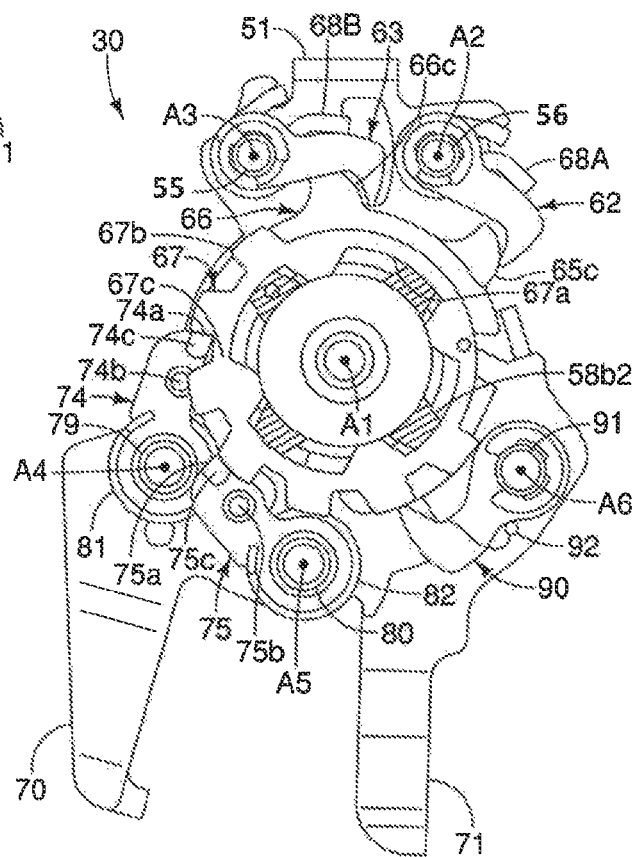
FIG. 32 is a rear elevational view, similar to FIG. 31, of the selected parts of the bicycle component positioning unit illustrated in FIG. 31 but with the positioning member (positioning ratchet and the pulling ratchet) removed.
Figure 33:
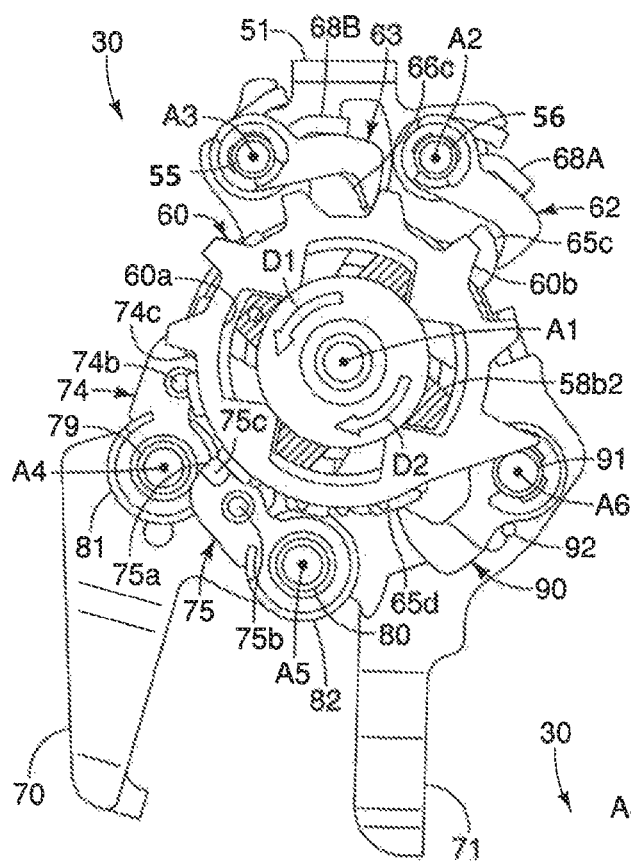
FIG. 33 is a rear elevational view, similar to FIGS. 27, 29 and 31, of the selected parts of the bicycle component positioning unit illustrated in FIGS. 27 to 32 but with the positioning ratchet of the positioning member rotating in a first direction to engage the second release member.
Figure 34:
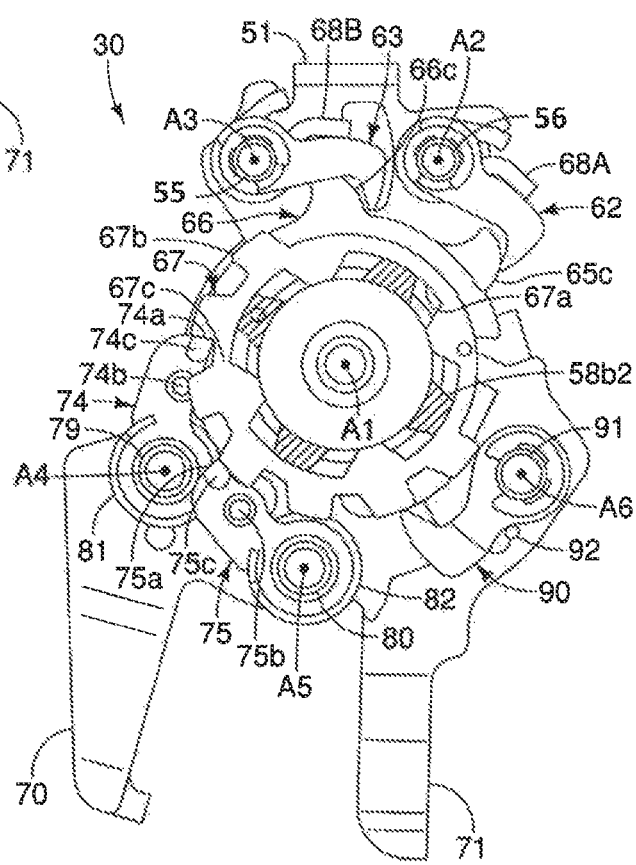
FIG. 34 is a rear elevational view, similar to FIG. 33, of the selected parts of the bicycle component positioning unit illustrated in FIG. 33 but with the positioning member (positioning ratchet and the pulling ratchet) removed.

The first release member 65 is movably supported on the support structure 50 between a first non-releasing position (see FIG. 27) and a first releasing position (see FIG. 31). In particular, the first release member 65 is rotatably supported on the support structure 50 about the rotational axis A1. The first maintaining member 62 is selectively moved from the first maintaining position to the first non-maintaining position in response to movement of the first release member 65 moving from the first non-releasing position to the first releasing position. In the illustrated embodiment, a first biasing element 68A biases the first release member 65 towards the first non-releasing position. The first maintaining member 62 restricts movement of the positioning member 59 and the wire take-up member 58 in the first direction D1 around the rotational axis A1 while the first maintaining member 62 is in the first maintaining position. On the other hand, the first maintaining member 62 permits movement of the positioning member 59 and the wire take-up member 58 in the first direction D1 around the rotational axis A1 while the first maintaining member 62 is in the first non-maintaining position. The first release member 65 is axially offset from the second release member 66 along the rotational axis A1. Stated differently, the first and second release members 65 and 66 are disposed at different axial locations along the rotational axis A1.

Figure 17:
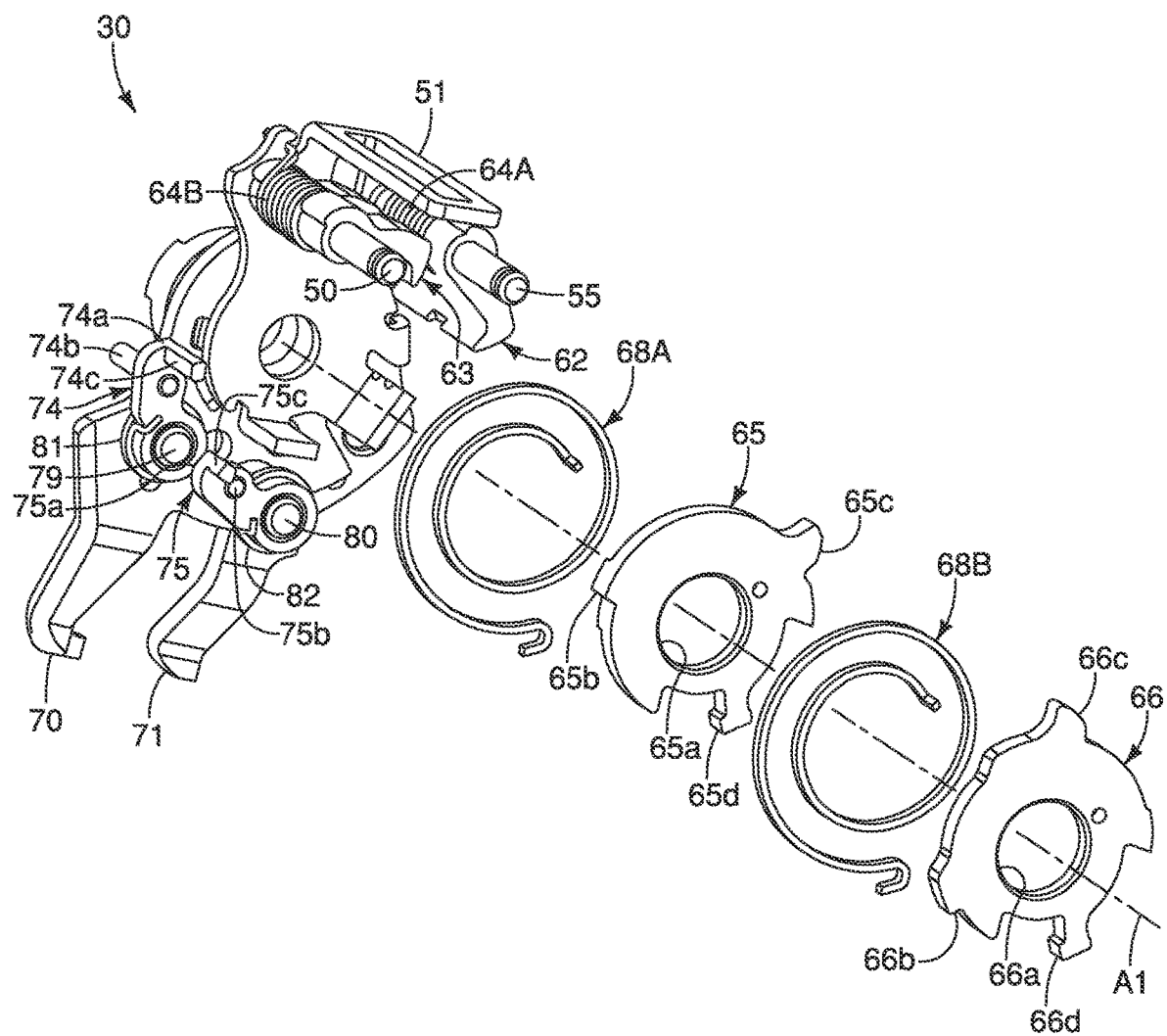
FIG. 17 is a partially exploded, rear perspective view of selected parts of the bicycle component positioning unit illustrated in FIGS. 9 to 14 as viewed from the rear of the bicycle component positioning unit.

In the illustrated embodiment, as best seen in FIG. 17, the first release member 65 includes a first release plate having a first opening 65a, a first pawl contact 65b, a first release cam 65c and a first pulling pawl abutment 65d. Also in the illustrated embodiment, as best seen in FIG. 17, the second release member 66 includes a second release plate having a second opening 66a, a second pawl contact 66b, a second release cam 66c and a second pulling pawl abutment 66d.

Figure 41:
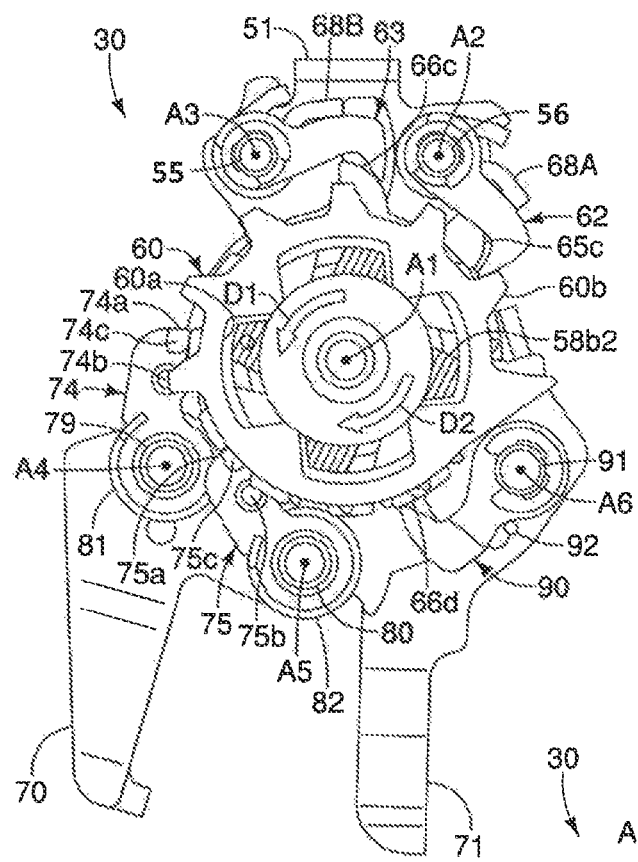
FIG. 41 is a rear elevational view, similar to FIGS. 27, 29, 31, 33, 35, 37 and 39, of the selected parts of the bicycle component positioning unit illustrated in FIGS. 27 to 40 but with the first operating member moved farther from the position illustrated in FIGS. 39 and 40 in the second direction without returning to its rest position such that the second release pawl rotates the second release member and the select member by the second release pawl and moves the second maintaining member out of engagement with the positioning ratchet of the positioning member, while the first release pawl remains in contact with the select member, which prevents the first release pawl from engages the first pawl contact of the second release member'.
Figure 42:
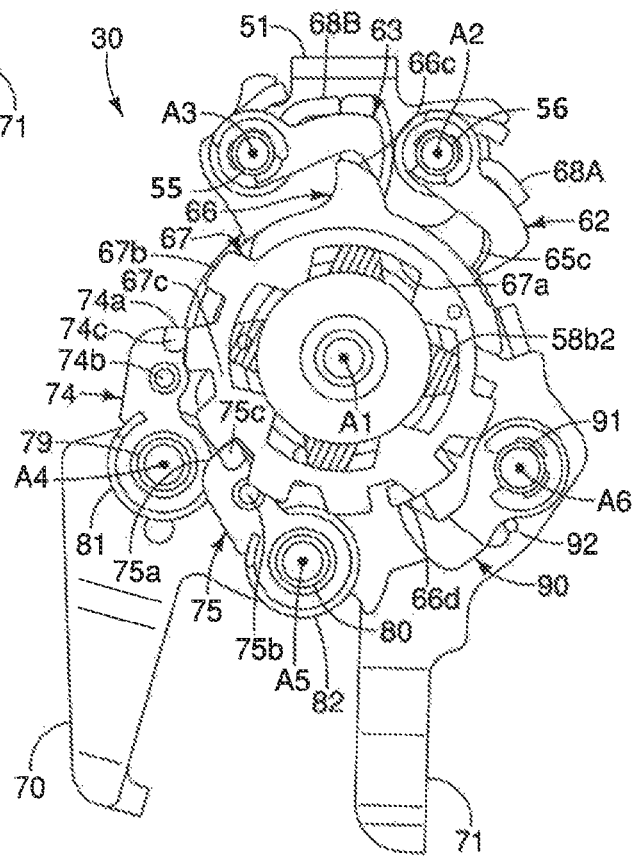
FIG. 42 is a rear elevational view, similar to FIG. 41, of the selected parts of the bicycle component positioning unit illustrated in FIGS. 27 to 40 but with the positioning member (positioning ratchet and the pulling ratchet) removed.

The second release member 66 is movably supported on the support structure 50 between a second non-releasing position (see FIG. 27) and a second releasing position (see FIG. 41). In particular, the second release member 66 is rotatably supported on the support structure 50 about the rotational axis A1. The second maintaining member 63 is selectively moved from a second maintaining position to a second non-maintaining position in response to movement of the second release member 66 moving from the second non-releasing position to the second releasing position. In the illustrated embodiment, a second biasing element 68B biases the second release member 66 towards the second non-releasing position. The second maintaining member 63 restricts movement of the positioning member 59 and the wire take-up member 58 in the first direction D1 around the rotational axis A1 while the second maintaining member 63 is in the second maintaining position. On the other hand, the second maintaining member 63 permits movement of the positioning member 59 and the wire take-up member 58 in the first direction D1 around the rotational axis A1 while the second maintaining member 63 is in the second non-maintaining position.

Figure 22:
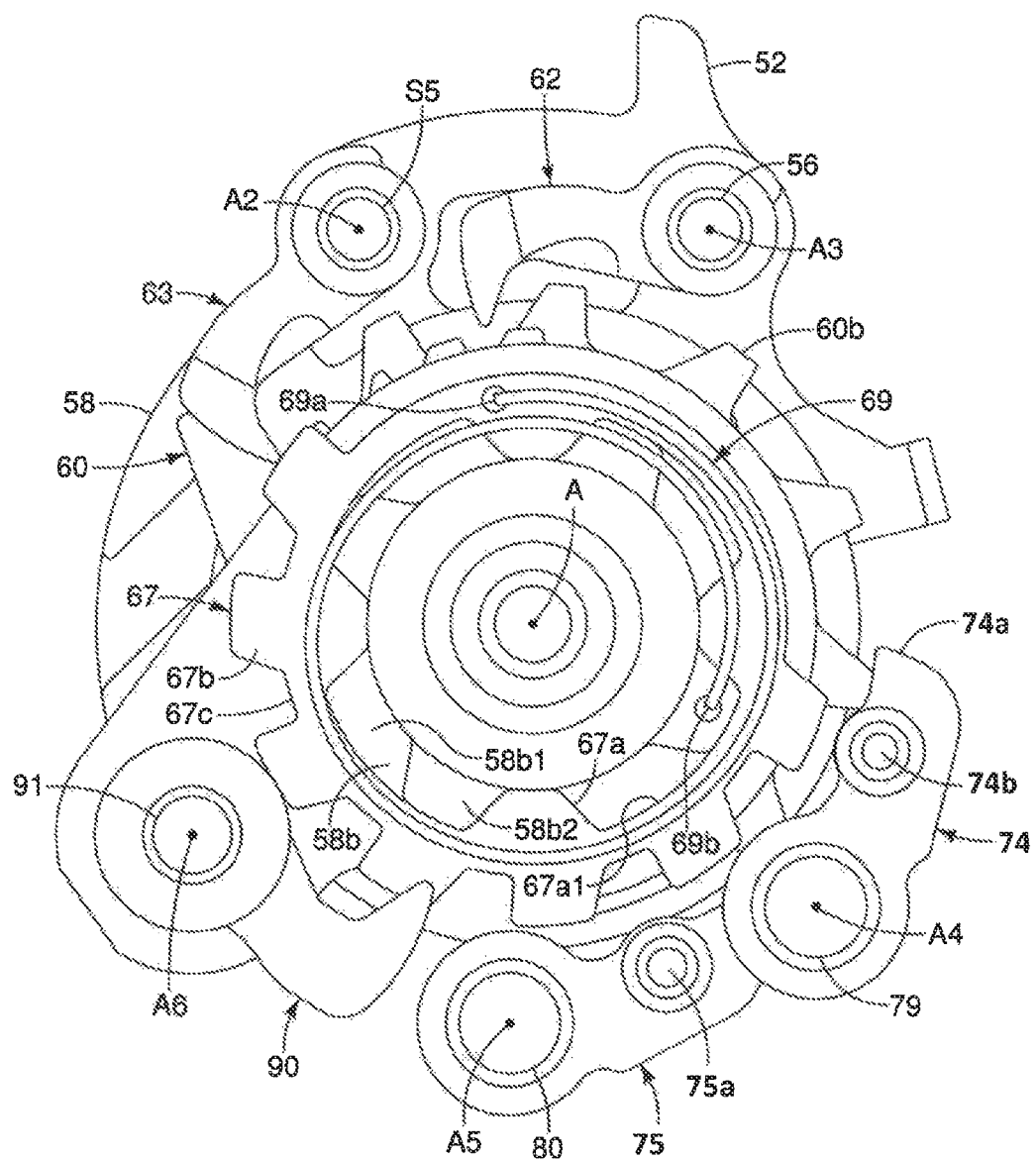
FIG. 22 is a front elevational view of selected parts of the bicycle component positioning unit illustrated in FIG. 20 with the selected parts in their rest positions.
Figure 23:
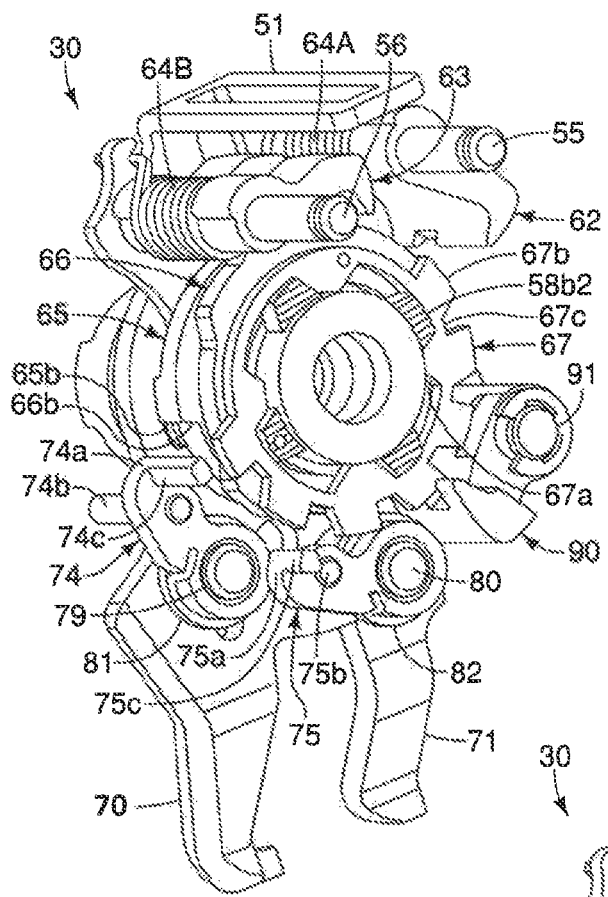
FIG. 23 is a rear perspective view of the selected parts of the bicycle component positioning unit illustrated in FIG. 20 with the wire take-up member in cross section and the selected parts in their rest positions.
Figure 24:
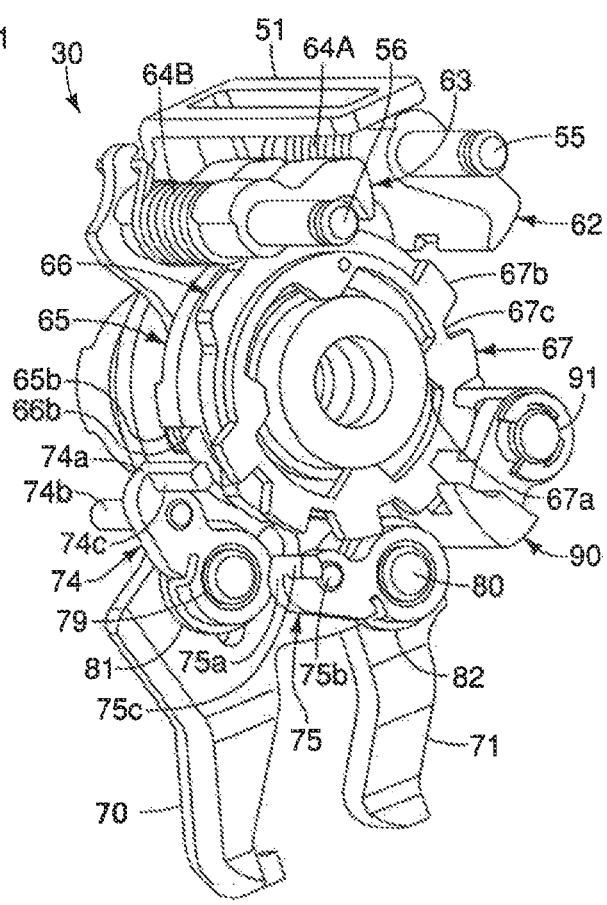
FIG. 24 is a rear perspective view, similar to FIG. 23, of the selected parts of the bicycle component positioning unit illustrated in FIG. 23 but with the wire take-up member removed.
Figure 25:
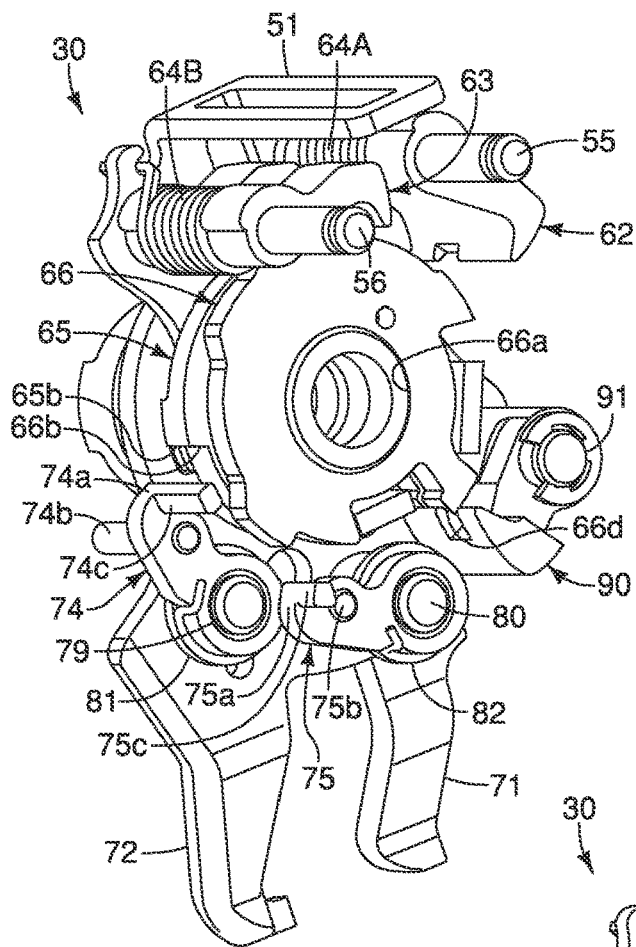
FIG. 25 is a rear perspective view, similar to FIG. 24, of the selected parts of the bicycle component positioning unit illustrated in FIG. 24 but with the select member removed.
Figure 26:
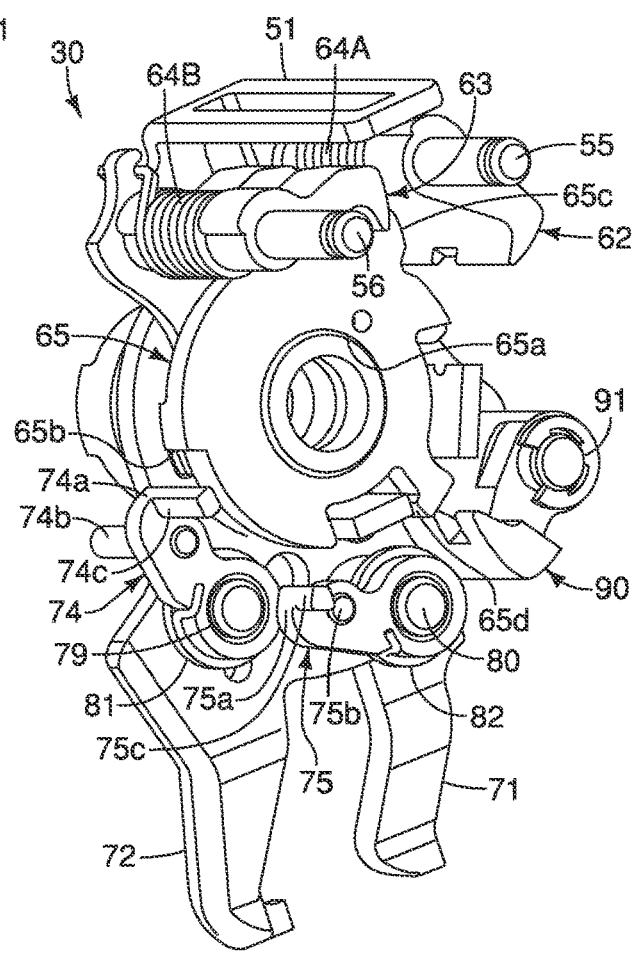
FIG. 26 is a rear perspective view, similar to FIG. 25, of the selected parts of the bicycle component positioning unit illustrated in FIG. 25 but with the second release member removed.

As best seen in FIGS. 18 and 19, in the select member 67 is a rigid plate. The select member 67 is movably supported on the support structure 50 between at least a first select position and a second select position. In particular, as best seen in FIG. 22, the wire take-up member 58 of the control body 57 movably supports the select member 67. More specifically, each of the four arc-shaped projections 58b of the wire take-up member 58 has a base part 58b1 and a reduced end part 58b2 having a smaller rotational dimension than the base part 58b1. The select member 67 has a non-circular mounting opening 67a that is configured with four lobes 67a1. Each of the lobes 67a1 has a rotational dimension than a larger than the rotational dimension of the reduced end parts 58b2 for permit a limited amount of rotational movement of the select member 67 on the wire take-up member 58. In this way, the select member 67 is movably arranged on the control body 57 to move within a prescribed range relative to the wire take-up member 58 of the control body 57.

As best seen in FIG. 22, a biasing element 69 is operatively coupled between the control body 57 and the select member 67, and biases the select member 67 and the control body 57 in opposite directions relative to each other around the rotational axis A1. The biasing element 69 has a first free end portion 69a that is engaged with the select member 67 and a second free end portion 69b that is engaged with the wire take-up member particular, for example, the biasing element 69 is a flat torsion spring that has a coiled portion spirally wound around the main support axle 53. The first free end portion 69a of the biasing element 69 is disposed in a hole of the select member 67. The second free end portion 69b of the biasing element 69 is disposed in a hole of one of the reduced end parts 58b2 of the wire take-up member 58.

In the installed position, the biasing element 69 is preloaded to bias the select member 67 in the second direction D1 about the rotational axis A1.

As a result of the above mentioned configuration between the select member 67 and the wire take-up member 58, during a cable releasing operation, the select member 67 initially moves in the first direction D1 about the rotational axis A1 while the wire take-up member 58 remains stationary. In the illustrated embodiment, as best seen in FIGS. 18 and 19, the select member 67 has a plurality of abutments 67b and a plurality of notches 67c. As explained later, the abutments 67b and the notches 67c regulate the movements of the first and second release members 65 and 66 so that the first and second maintaining members 62 and 63 are alternately disengaged and engaged with the positioning teeth 60b of the positioning ratchet 60 in response to operation of the first user operating lever 26 as explained below.

The bicycle component positioning unit 30 of the bicycle operating device 12 further comprises a first operating member 70 that is operated by the first user operating lever 26 to perform a cable releasing operation as shown in FIGS. 27 to 42. The bicycle component positioning unit 30 of the bicycle operating device 12 further comprises a second operating member 71 that is operated by the second user operating lever 28 to perform a cable pulling operation as shown in FIGS. 43 to 47. In the illustrated embodiment, the first and second operating members 70 and 71 are trigger type members that return to a rest position when released from and operated position. For the sake of convenience, the rest position of the first operating member 70 will be referred to hereinafter as a first rest position, and the operated position of the first operating member 70 will be referred to hereinafter as a first rest operated. Likewise, the rest position of the second operating member 71 will be referred to hereinafter as a second rest position, and the operated position of the second operating member 71 will be referred to hereinafter as a second rest operated.

As seen in FIGS. 27 to 42, the first operating member 70 is movably supported on the support structure 50 between the first rest position to the first operated position. In particular, the first operating member 70 is pivotally supported on the support structure 50 by the main support axle 53 as discussed below in more detail. Thus, the first operating member 70 has a pivot axis that is coaxial with the rotational axis A1 of the first and second release members 65 and 66. The first operating member 70 is configured to be biased towards the first rest position. In particular, for example, a biasing element 72 in the form of a flat torsion spring is mounted between the first operating member 70 and the first stationary support plate 51 to bias the first operating member 70 towards the first rest position. Here, the biasing element 72 has a coiled portion spirally wound around the main support axle 53. A first free end portion of the biasing element 72 is disposed in a hole of the first operating member 70. A second free end portion of the biasing element 72 is hooked onto the first stationary support plate 51. In the installed position, the biasing element 72 is preloaded to bias the first operating member 70 into contact with an abutment of the first stationary support plate 51 while the first operating member 70 is in the first rest position. In this way, the first operating member 70 is operated in response to the operation of the first user operating lever 26 from its rest position to its operated position such that when the first user operating lever 26 is released, the first operating member 70 returns to the first rest position.

As seen in FIGS. 43 to 47, the second operating member 71 is movably supported on the support structure between the second rest position to the second operated position. In particular, the second operating member 71 is operated in response to the operation of the second user operating lever 28 from its rest position to its operated position as discussed below in more detail. The second operating member 71 is configured to be biased towards the second rest position. In particular, for example, a biasing element 73 in the form of a flat torsion spring is mounted between the second operating member 71 and the first stationary support plate 51 to bias the second operating member 71 towards the second rest position. Here, the biasing element 73 has a coiled portion spirally wound around the main support axle 53. A first free end portion of the biasing element 73 is disposed in a hole of the second operating member 71. A second free end portion of the biasing element 73 is hooked onto the first stationary support plate 51. In the installed position, the biasing element 73 is preloaded to bias the second operating member 71 into contact with an abutment of the first stationary support plate 51 while the second operating member 71 is in the first rest position. In this way, the second operating member 71 is operated in response to the operation of the second user operating lever 28 from its rest position to its operated position such that when the second user operating lever 28 is released, the second operating member 71 returns to the second rest position.

Figure 16:
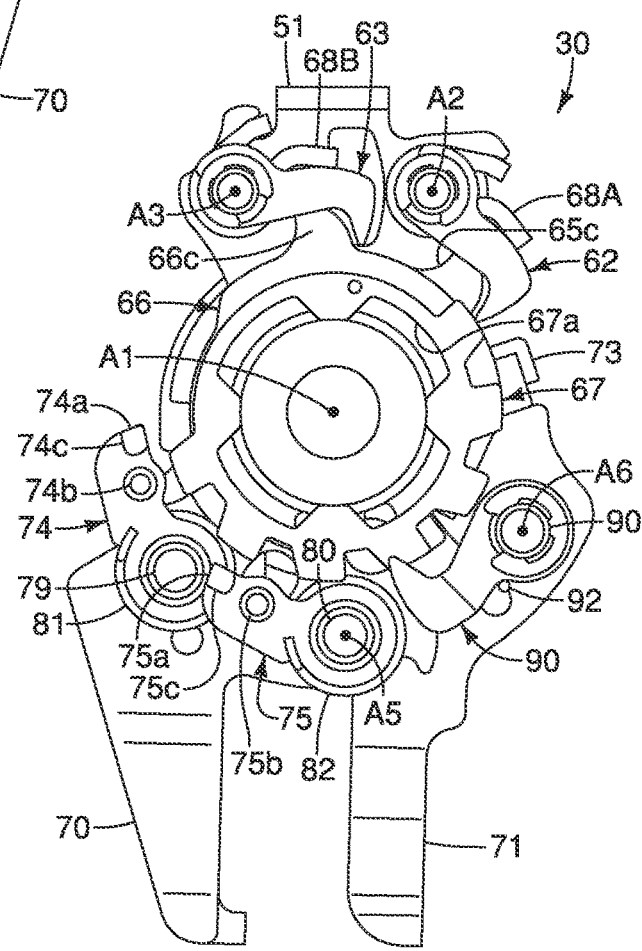
FIG. 16 is a rear elevational view of the selected parts of the bicycle component positioning unit illustrated in FIG. 15 with the selected parts in their rest positions.

As seen in FIGS. 16 and 17, the bicycle component positioning unit 30 of the bicycle operating device 12 further comprises a first release pawl 74 and a second release pawl 75. The first and second release pawls 74 and 75 are configured and arranged to engage and rotate first and second release members 65 and 66, respectively, in the second direction D2. In particular, the first release pawl 74 has a first engagement tooth 74a that engages a peripheral edge of the first release member 65 when the first operating member 70 is rotated in the second direction D2 to perform a cable releasing operation. Similarly, the second release pawl 75 has a second engagement tooth 75a that engages a peripheral edge of the second release member 66 when the first operating member 70 is rotated in the second direction D2 to perform a cable releasing operation. As a result of either of the first and second release members 65 and 66 being rotated in the second direction D2, the positioning ratchet 60 is released from the one of the first and second maintaining members 62 and 63 to permit rotation of the wire take-up member 58 in the second direction D2.

Here, in the illustrated embodiment, the control body 57 is biased in the first direction D1 about the rotational axis A1 by a biasing element 76 as shown in FIGS. 18 and 19. The biasing element 76 is a flat-coiled torsion spring. The biasing element 76 has a coiled portion that is wrapped around the main support axle 53. The biasing element 76 has a first free end portion that is disposed in a hole of the wire take-up member 58, and a second free end portion that is hooked onto the second stationary support plate 52. In this way, the wire take-up member 58 and the positioning member 59 (i.e., the control body 57) are biased by the biasing element 76 about the rotational axis A1 in the first direction D1, which corresponds to the cable releasing direction.

Figure 29:
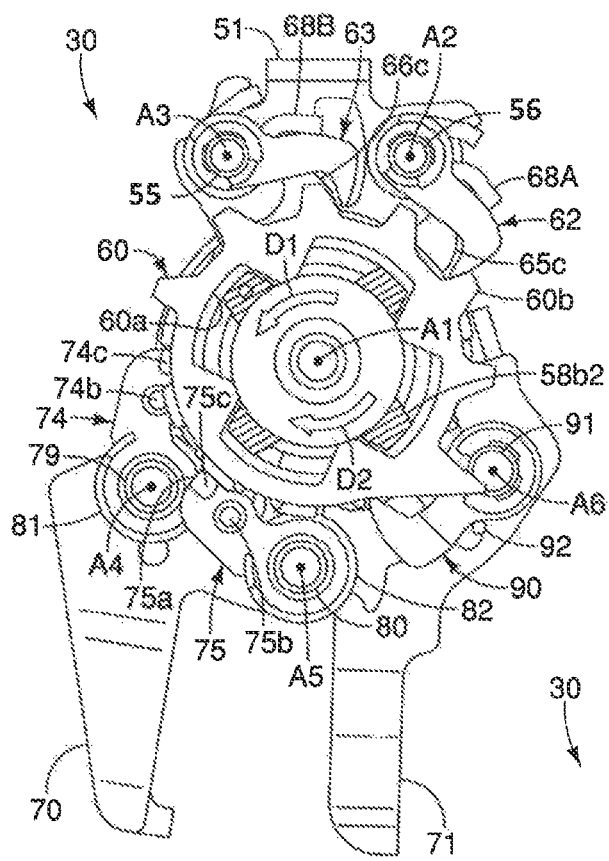
FIG. 29 is a rear elevational view, similar to FIG. 27, of the selected parts of the bicycle component positioning unit illustrated in FIG. 27 but with the first operating member moved from the rest position to start a cable releasing operation in which the first release pawl engages a first pawl contact of the first release member and the select member, while the second release pawl contacts the select member, which prevents the second release pawl from engages a second pawl contact of the second release member.
Figure 30:
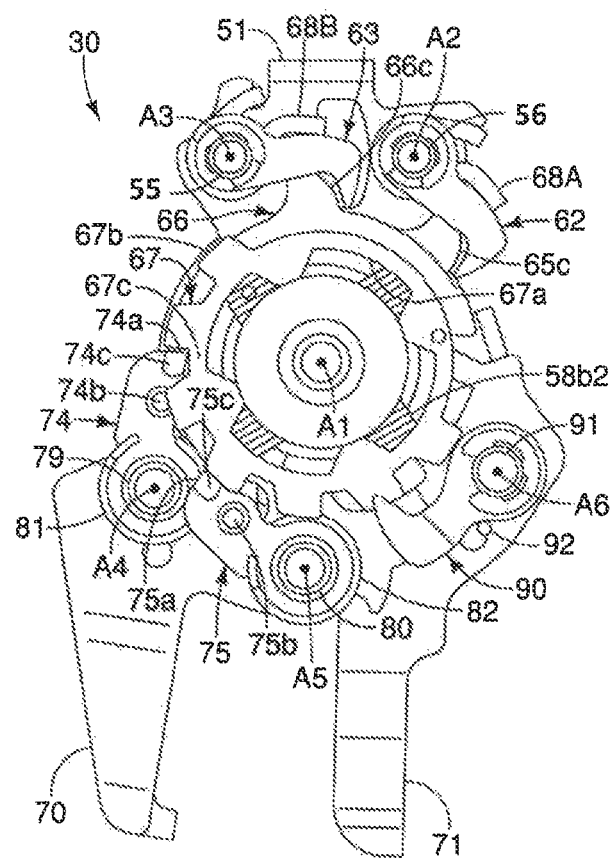
FIG. 30 is a rear elevational view, similar to FIG. 29, of the selected parts of the bicycle component positioning unit illustrated in FIG. 29 but with the positioning member (positioning ratchet and the pulling ratchet) removed.
Figure 39:
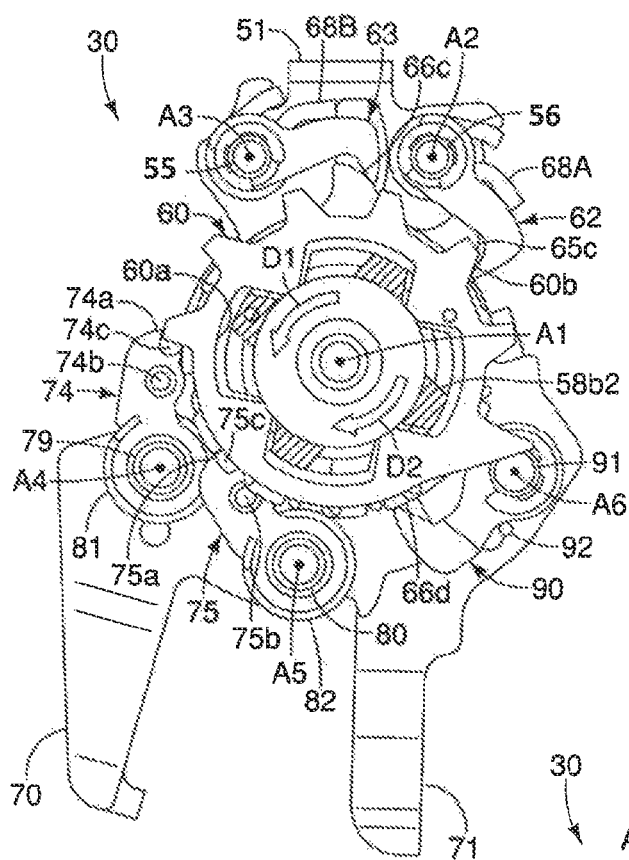
FIG. 39 is a rear elevational view, similar to FIGS. 27, 29, 31, 33, 35 and 37, of the selected parts of the bicycle component positioning unit illustrated in FIGS. 27 to 38 but with the first operating member moved farther from the position illustrated in FIGS. 37 and 38 in the second direction without returning to its rest position such that the second release pawl disengages from the second pawl contact of the second release member and the select member, while the first release pawl contacts the select member, which prevents the first release pawl from engages the first pawl contact of the first release member.
Figure 40:
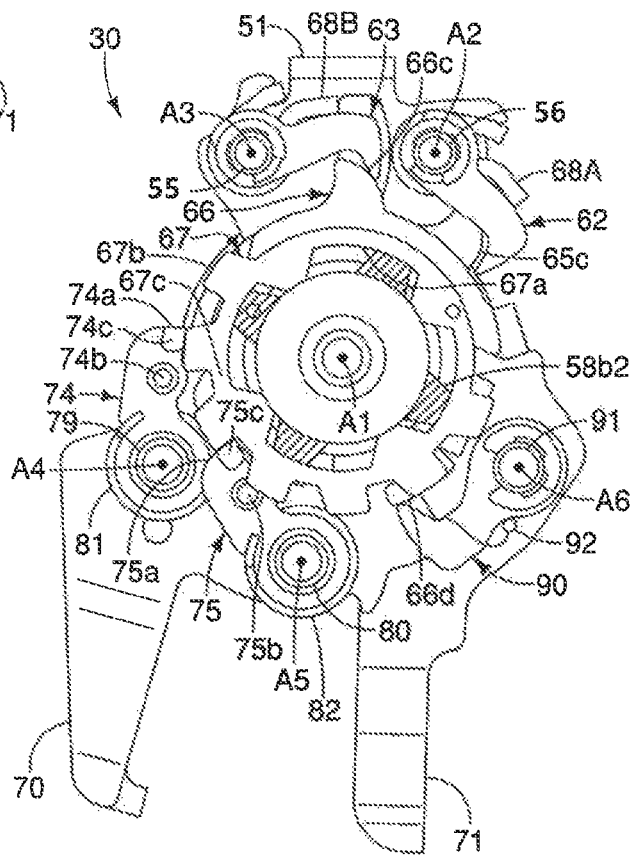
FIG. 40 is a rear elevational view, similar to FIG. 39, of the selected parts of the bicycle component positioning unit illustrated in FIGS. 27 to 39 but with the positioning member (positioning ratchet and the pulling ratchet) removed.

As seen in FIGS. 29, 30, 39 and 40, the first and second release pawls 74 and 75 are mounted on the first operating member 70 for selectively engaging the first and second release members 65 and 66, respectively. In particular, as seen in FIGS. 29 and 30, the first engagement tooth 74a for selectively engaging the first release member 65 to rotate the first release member 65 in the second direction D2. Similarly, as seen in FIGS. 39 and 40, the second engagement tooth 75a selectively engages the second release member 66 to rotate the second release member 66 in the second direction D2. The first and second release members 65 and 66 move independently of each other in an alternating manner when performing a double cable release operation in which the first operating member 70 is operated from the first rest position to the first operated position and then to an intermediate operated position and back to the first operated position without returning to first rest position. To control this movement, the first release pawl 74 includes a first control pin 74b and a first control abutment 74c, and the second release pawl 75 includes a second control pin 75b and a second control abutment 75c.

Figure 27:
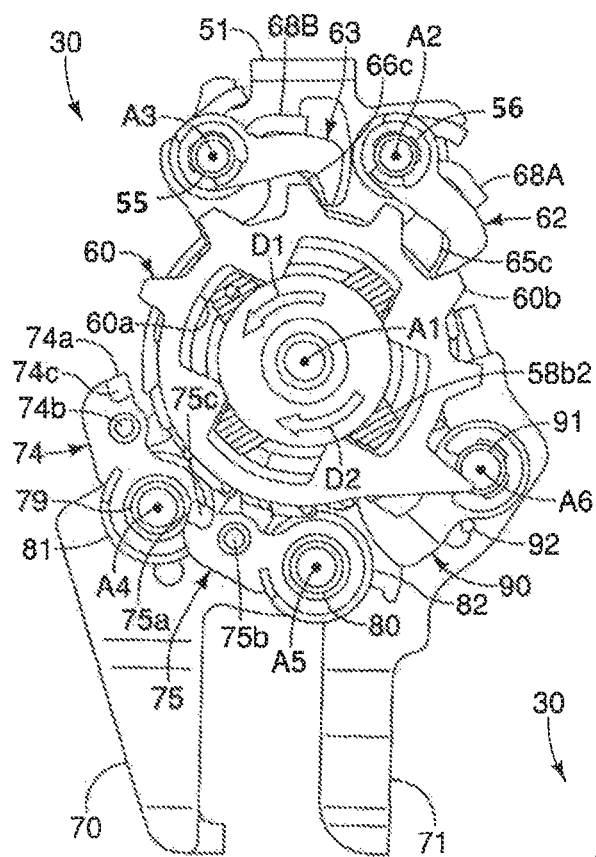
FIG. 27 is a rear elevational view of selected parts of the bicycle component positioning unit illustrated in FIGS. 9 to 14 with the selected parts in their rest positions.
Figure 28:
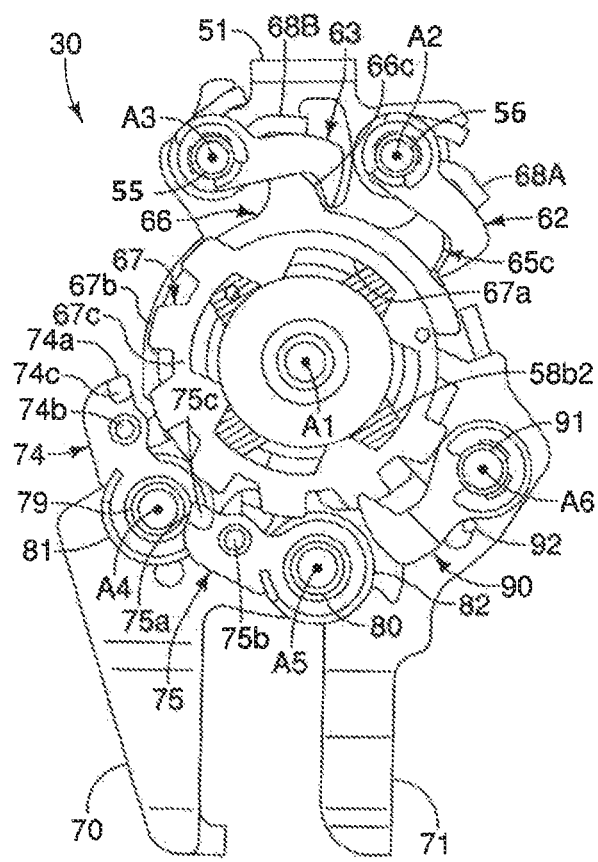
FIG. 28 is a rear elevational view, similar to FIG. 20, of the selected parts of the bicycle component positioning unit illustrated in FIG. 20 but with the positioning member (positioning ratchet and the pulling ratchet) removed.

In the illustrated embodiment, as seen in FIGS. 27 and 28, the first and second release pawls 74 and 75 are biased towards engagement with the first and second release members 65 and 66 (i.e., the peripheral edges of the first and second release plates), respectively, but held out of engagement with the first and second release members 65 and 66 while the first and second operating members 70 and 71 are in the first and second rest positions, respectively. In particular, the first release pawl 74 is pivotally mounted on the first operating member 70 by a pivot pin 79, while the second release pawl 75 is pivotally mounted on the first operating member 70 by a pivot pin 80. The pivot pin 79 defines a pivot axis A4 that is parallel to the rotational axis A1, while the pivot pin 80 defines a pivot axis A5 that is parallel to the rotational axis A1. A biasing element 81 is mounted on the pivot pin 79 for biasing the first release pawl 74 about the pivot axis A4 of the pivot pin 79 such that the first engagement tooth 74a is biased towards engagement with the peripheral edge of the first release member 65. Similarly, a biasing element 82 is mounted on the pivot pin 80 for biasing the second release pawl 75 about the pivot axis A5 of the pivot pin 80 such that the second engagement tooth 75a is biased towards engagement with the peripheral edge of the second release member 66. Here, in the illustrated embodiment, the biasing elements 81 and 82 are torsion springs. The biasing element 81 has a coiled portion wrapped on the pivot pin 79, a first free end portion hooked onto the first release member 65, and a second free end portion hooked onto the first operating member 70. In this way, the first release pawl 74 is biased about the center pivot axis of the pivot pin 79 towards engagement with the peripheral edge of the first release member 65. Likewise, the biasing element 82 has a coiled portion wrapped on the pivot pin 80, a first free end portion hooked onto the second release member 66, and a second free end portion hooked onto the first operating member 70. In this way, the second release pawl 75 is biased about the center pivot axis of the pivot pin 80 towards engagement with the peripheral edge of the second release member 66.

Figure 11:
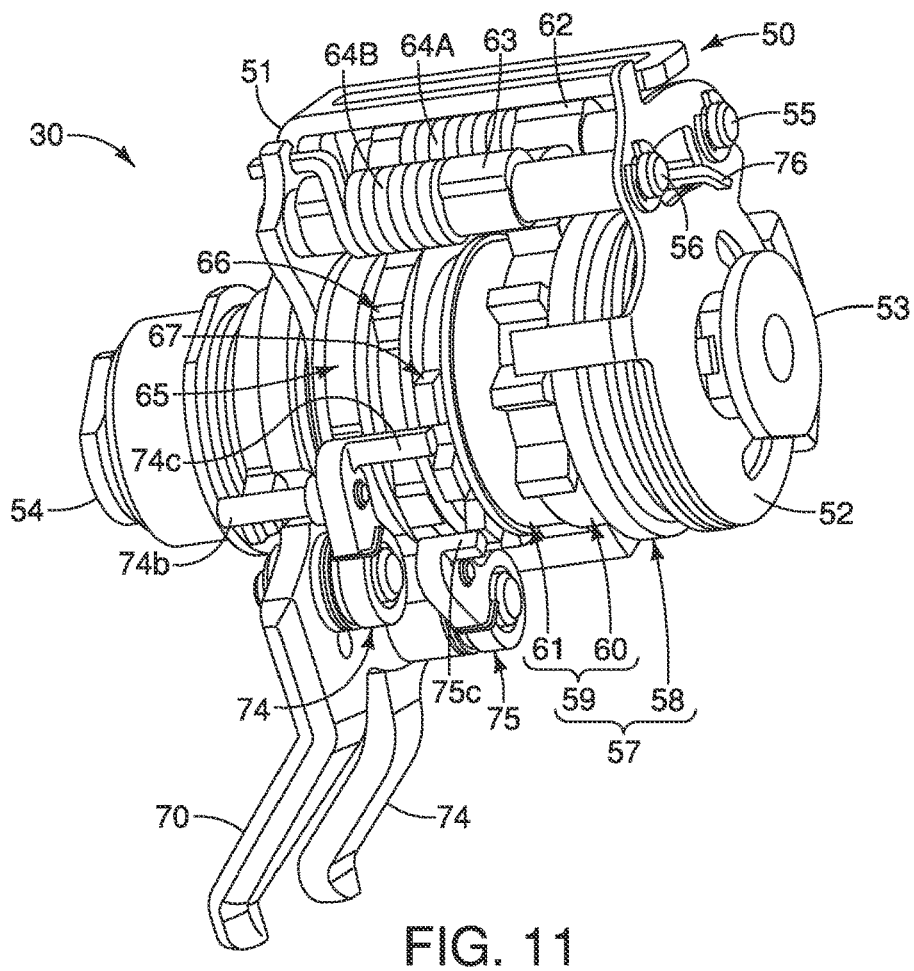
FIG. 11 is a first rear perspective view of the bicycle component positioning unit illustrated in FIGS. 9 and 10 with the parts in their rest positions.
Figure 12:
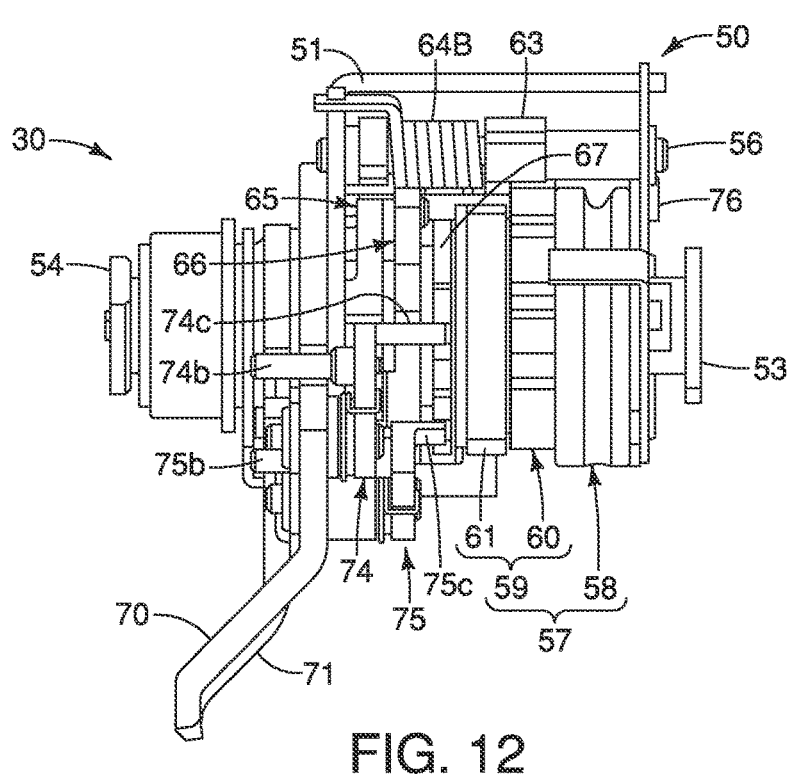
FIG. 12 is a first side perspective view of the bicycle component positioning unit illustrated in FIGS. 9 to 11 with the parts in their rest positions.
Figure 13:
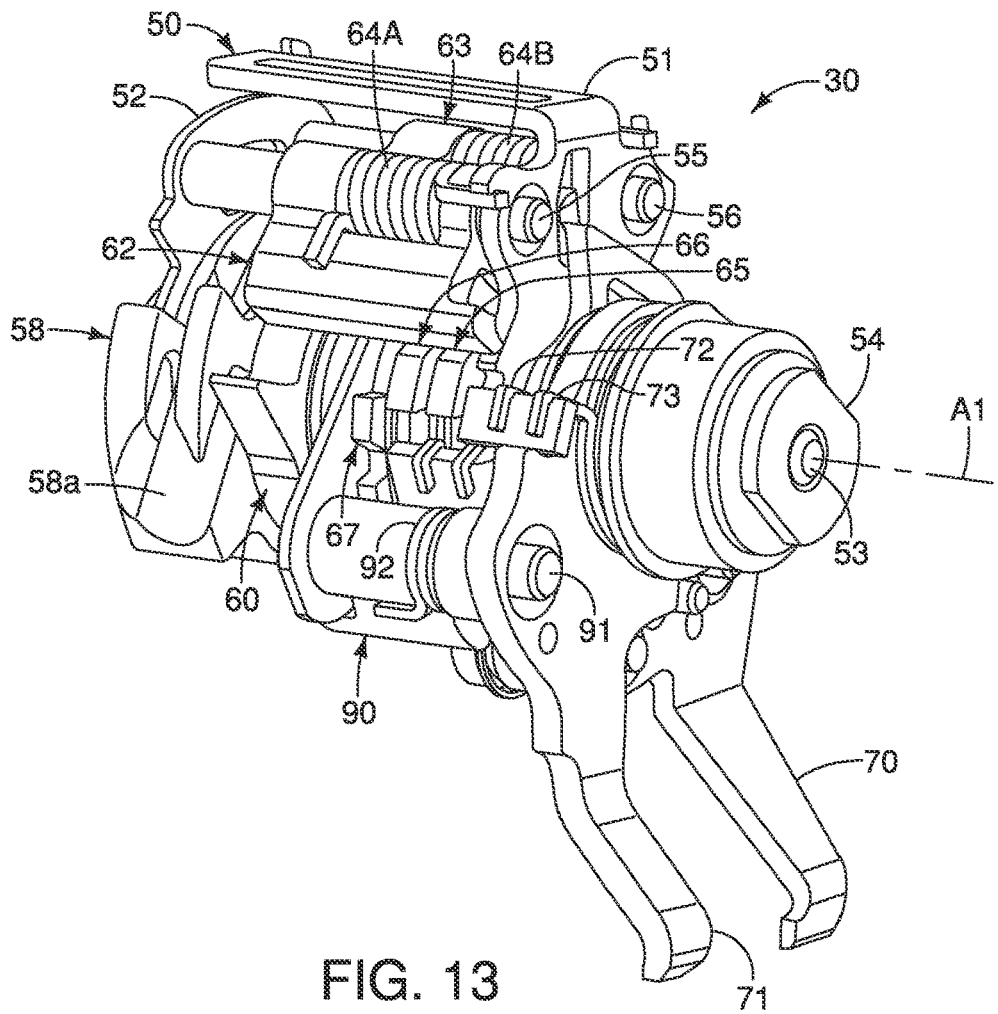
FIG. 13 is a second front perspective view of the bicycle component positioning unit illustrated in FIGS. 9 to 12 with the parts in their rest positions.

As seen in FIGS. 11, 16 and 17, while the parts of the bicycle operating device 12 are in their rest positions, the engagement teeth 74a and 75a are held out of contact with the peripheral edges of the first and second release members 65 and 66, respectively. In particular, the first and second release pawls 74 and 75 are held out of engagement from the first and second release members 65 and 66, respectively, by the first and second control pins 74b and 75b contacting the second operating member 71. More specifically, the first control pin 74b extends from the first release member 65 such that the free end of the first control pin 74b contacts the peripheral edge of the second operating member 71 while the parts of the bicycle operating device 12 are in their rest positions. Likewise, the second control pin 75b extends from the second release member 66 through an arcuate slot in the second operating member 71 such that the free end of the second control pin 75b contacts the peripheral edge of the second operating member 71 while the parts of the bicycle operating device 12 are in their rest positions. In this way, the first and second release pawls 74 and 75 are both held out of engagement from the peripheral edges of the first and second release members 65 and 66, respectively, by the second operating member 71 while the parts of the bicycle operating device 12 are in their rest positions. Also when the second operating member 71 is pivoted from the second rest position to the second operated position, the first operating member 70 moves with the second operating member 71. In this way, during a cable pulling operation, the first and second release pawls 74 and 75 are both held out of engagement from the peripheral edges of the first and second release members 65 and 66, respectively, by the second operating member 71.

When the first operating member 70 is pivoted from the first rest position to the first operated position, the first and second control pins 74b and 75b move off the peripheral edge of the second operating member 71 so that the biasing forces of the biasing elements 81 and 82 can pivot the first and second release pawls 74 and 75 towards engagement with the first and second release members 65 and 66, respectively. However, due to the first and second contact abutments 74c and 75c and the configuration of the select member 67, only one of the first and second release pawls 74 and 75 is allowed to engage an associated one of the first and second release members 65 and 66 at a time. The select member 67 permits movement of the first release member 65 and prevents movement of the second release member 66 while the select member 67 is in the first select position.

As seen in FIGS. 28, 30, 32 and 34, the first select position of the select member 67 occurs when the select member 67 is at a rest position in which the bicycle component positioning unit 30 has not been operated and while the first operating member 70 is pivoting from the first rest position to the first operated position. In particular, while the select member 67 is in the first select position, the first contact abutment 74c of the first release pawl 74 can move into one of the notches 67c of the select member 67 so that the first engagement tooth 74a engages the first pawl contact 65b of the first release member 65 and the first contact abutment 74c engages a circumferentially facing surface of one of the abutments 67b of the select member 67. Thus, the first pawl contact 65b is engaged by the first release pawl 74 while the select member 67 is in the first select position. In this way, as the first operating member 70 pivots from the first rest position to the first operated position, the first release pawl 74 rotates both the first release member 65 and the select member 67 in the second direction D2. At the same time, while the select member 67 is in the first select position, the second control abutment 75c of the second release pawl 75 engages a radially facing surface of one of the abutments 67b. In this way, as the first operating member 70 pivots from the first rest position to the first operated position, the second release pawl 75 is prevented from pivoting into engagement with the second release member 66. As the first release member 65 and the select member 67 rotates in the second direction D2, the first maintaining member 62 is pivoted from the first maintaining position to the first non-maintaining position so as to disengage the first maintaining member 62 from one of the positioning teeth 60b. As a result, the control body 57 (i.e., wire take-up member 58, the positioning ratchet 60 and the pulling ratchet 61) is released to rotate in the first direction D1 until one of the positioning teeth 60b of the positioning ratchet 60 engages the second maintaining member 63.

Figure 35:
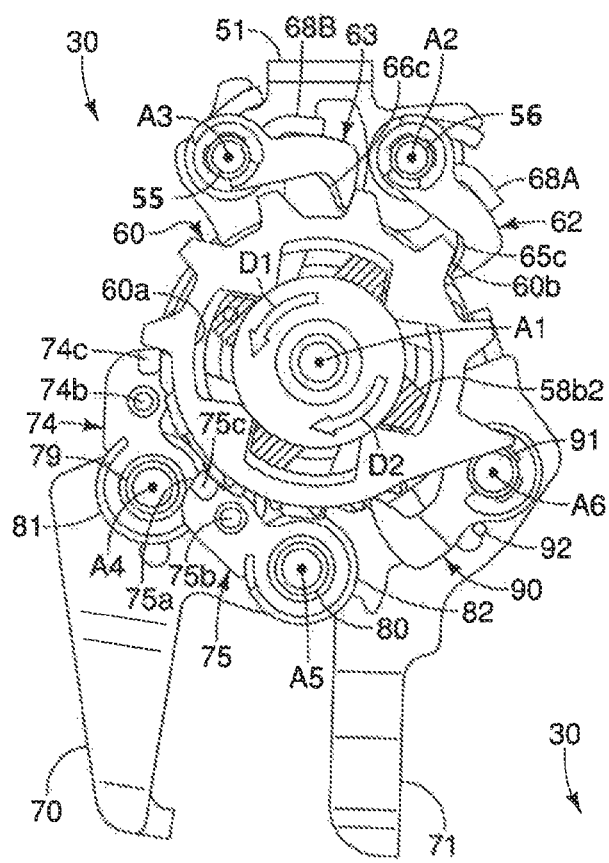
FIG. 35 is a rear elevational view, similar to FIGS. 27, 29, 31 and 33, of the selected parts of the bicycle component positioning unit illustrated in FIGS. 27 to 34 but with the first operating member moving back towards its rest position such that the first release pawl disengages from the first pawl contact of the first release member and the select member prior to the first operating member reaching its rest position, while the second release pawl remains in contact the select member, which prevents the second release pawl from engages the second pawl contact of the second release member.
Figure 36:
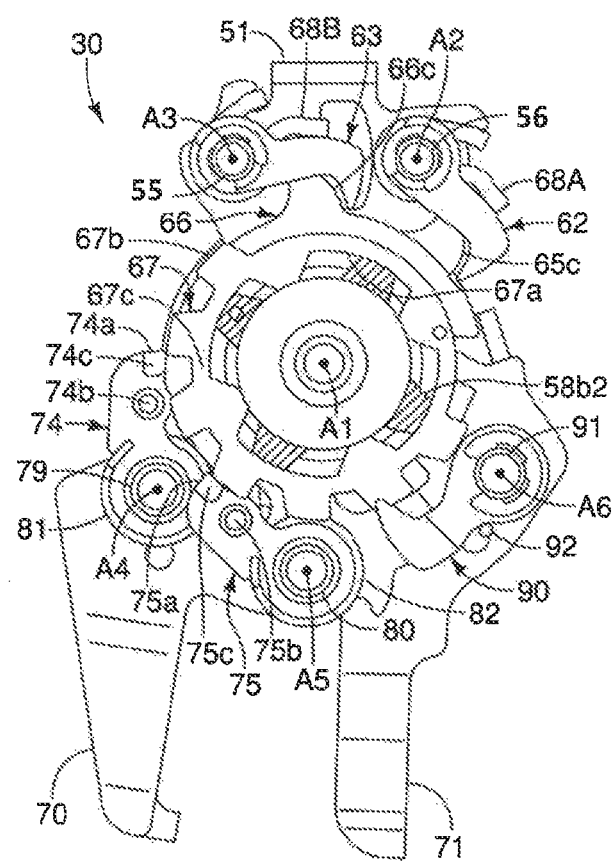
FIG. 36 is a rear elevational view, similar to FIG. 35, of the selected parts of the bicycle component positioning unit illustrated in FIG. 35 but with the positioning member (positioning ratchet and the pulling ratchet) removed.
Figure 37:
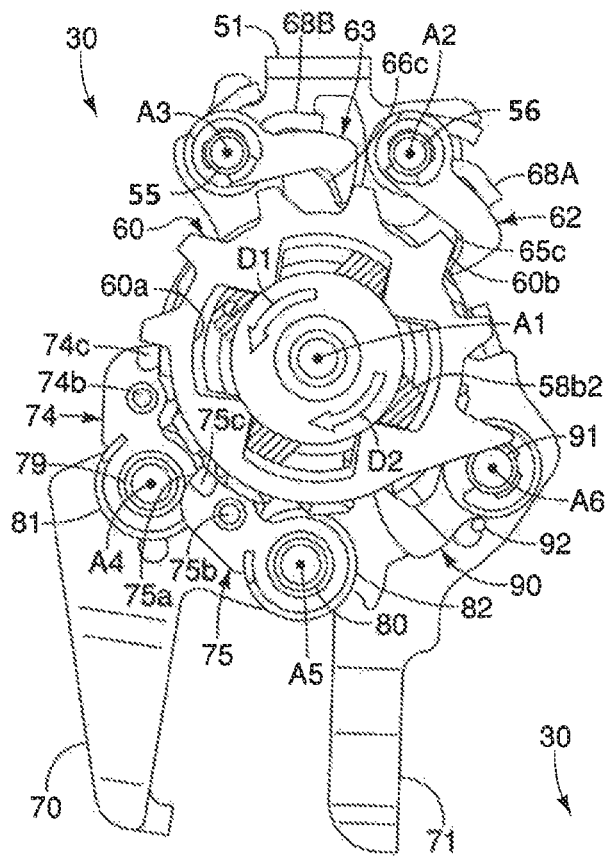
FIG. 37 is a rear elevational view, similar to FIG. 35, of the selected parts of the bicycle component positioning unit illustrated in FIGS. 27 to 36 but with the select member rotating in the first direction.
Figure 38:
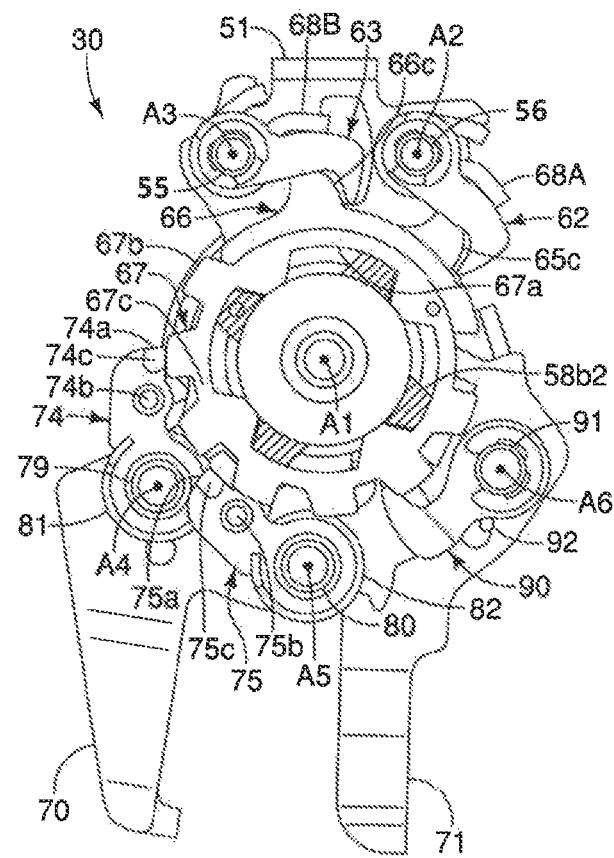
FIG. 38 is a rear elevational view, similar to FIG. 37, of the selected parts of the bicycle component positioning unit illustrated in FIG. 37 but with the positioning member (positioning ratchet and the pulling ratchet) removed.

Now the first operating member 70 can be pivoted from the first operated position back towards the first rest position as seen in FIGS. 35 and 36. If the first operating member 70 is stopped before reaching the first rest position as seen in FIGS. 37 and 38, then the select member 67 will rotate in the first direction D1 to the second select position of the select member 67. In other words, the second select position of the select member 67 occurs after the bicycle component positioning unit 30 has been operated to perform a cable releasing operation and the first operating member 70 is in a partially operated position between the first operated position and the first rest position.

As seen in FIGS. 37 to 42, the select member 67 permits movement of the second release member 66 and prevents movement of the first release member 65 while the select member 67 is in the second select position. In particular, while the select member 67 is in the second select position, the second engagement tooth 75a of the second release pawl 75 can move into one of the notches 67c of the select member 67 such that the second engagement tooth 75a can engage the second pawl contact 66b of the second release member 66 and the second control abutment 75c can engage a circumferentially facing surface of one of the abutments 67b of the select member 67. Thus, the second pawl contact 66b is engaged by the second release pawl 75 while the select member 67 is in the second select position. In this way, as the first operating member 70 pivots from this intermediate or partially operated position to the first operated position, the second release pawl 75 rotates both the second release member 66 and the select member 67 in the second direction D2. At the same time, while the select member 67 is in the second select position, the first control abutment 74c of the first release pawl 74 engages a radially facing surface of one of the abutments 67b. In this way, as the first operating member 70 pivots from this intermediate or partially operated position to the first operated position, the first release pawl 74 is prevented from pivoting into engagement with the first release member 65. As the second release member 66 and the select member 67 rotates in the second direction D2, the second maintaining member 63 is pivoted from the second maintaining position to the second non-maintaining position so as to disengage the second maintaining member 63 from one of the positioning teeth 60b. As a result, the control body 57 (i.e., wire take-up member 58, the positioning ratchet 60 and the pulling ratchet 61) is released to rotate in the first direction D1 until one of the positioning teeth 60b of the positioning ratchet 60 engages the first maintaining member 62. Now the first operating member 70 can be pivoted from the first operated position back towards the first rest position.

Figure 45:
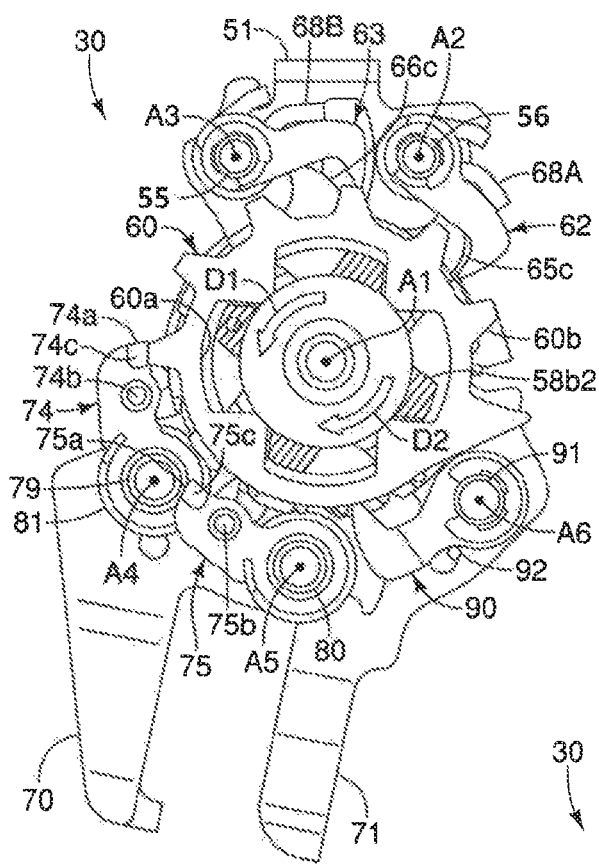
FIG. 45 is a rear elevational view, similar to FIG. 27, of the selected parts of the bicycle component positioning unit illustrated in FIG. 27 but with the second operating member moved from its rest position in the second direction to start a cable pulling operation in which a pulling pawl engages the pulling ratchet of the positioning member to rotate the positioning member (positioning ratchet and the pulling ratchet) along with the wire take-up (not shown in FIG. 45), and in which the first operating member and the first and second release pawls are moved by the second operating member in the second direction, while the first and second release pawls remain disengaged from the first and second release members and the select member.
Figure 46:
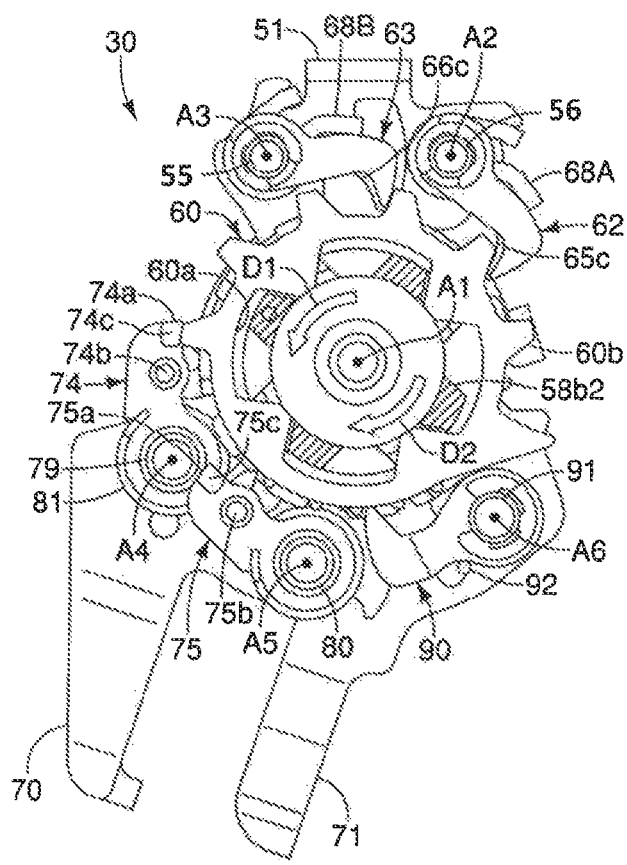
FIG. 46 is a rear elevational view, similar to FIG. 45, of the selected parts of the bicycle component positioning unit illustrated in FIGS. 27 to 45 but with the positioning member (positioning ratchet and the pulling ratchet) removed.

As seen in FIGS. 45 and 46, the second operating member 71 is movably arranged to rotate the positioning member 59 and the wire take-up member 58 in the second direction D2 as the second operating member 71 moves from the second rest position to the second operated position. In particular, the bicycle component positioning unit 30 of the bicycle operating device 12 further comprises a pulling pawl 90 that is mounted on the second operating member 71. Specifically, the pulling pawl 90 is pivotally mounted on a pivot pin 91 that is fixed to the second operating member 71. The pivot pin 91 defines a pivot axis A6 that is parallel to the rotational axis A1.

Thus, the second operating member 71 includes the pulling pawl 90 that engages the pulling teeth 61b and rotates the positioning member 59. The pulling pawl 90 engages the pulling teeth 61b and rotates the positioning member 59 and the wire take-up member 58 in the second direction D2 about the rotational axis A1 as the second operating member 71 moves from the second rest position to the second operated position. The pulling pawl 90 is biased towards engagement with the pulling teeth 61b while the first and second operating members 70 and 71 are in the first and second rest positions, respectively. Specifically, a biasing element 92 is provided on the pivot pin 91 to bias the pulling pawl 90 towards engagement with the pulling teeth 61b.

The pulling pawl 90 is moved out of a path of the pulling teeth 61b as the first operating member 70 moves from the first rest position toward the first operated position.

As mentioned above, the first release member includes the abutment 65d that moves the pulling pawl 90 out of engagement with the pulling teeth 61b as the first release member 65 is moved by movement of the first operating member 70 from the first rest position to the first operated position. Likewise, the second release member 66 includes the abutment 66d that moves the pulling pawl 90 out of engagement with the pulling teeth 61b as the second release member 65 is moved by movement of the first operating member 70 from the first rest position to the first operated position.

Figure 43:
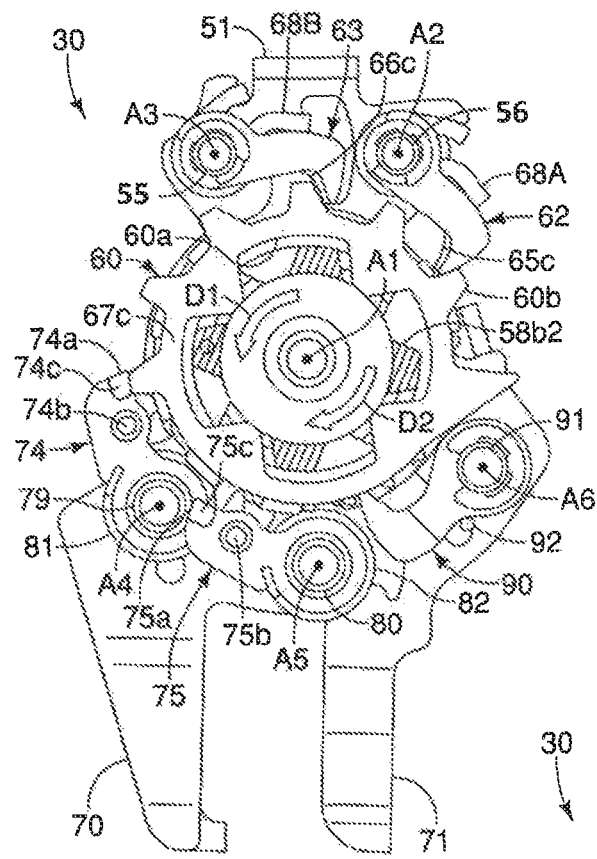
FIG. 43 is a rear elevational view of the selected parts of the bicycle component positioning unit illustrated in FIGS. 27 to 42 with the selected parts returned to their rest positions after the two stage cable releasing operation of FIGS. 27 to 43.
Figure 44:
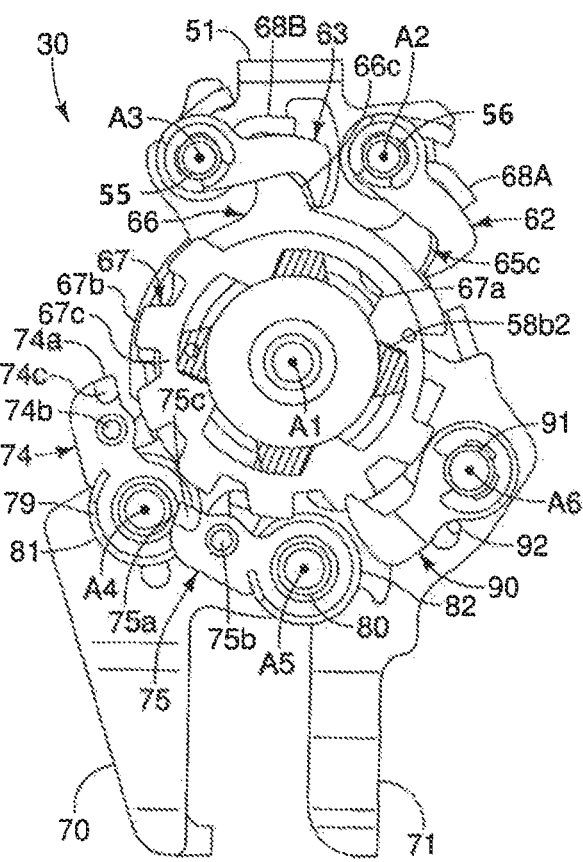
FIG. 44 is a rear elevational view, similar to FIG. 43, of the selected parts of the bicycle component positioning unit illustrated in FIGS. 27 to 43 but with the positioning member (positioning ratchet and the pulling ratchet) removed.
Figure 47:
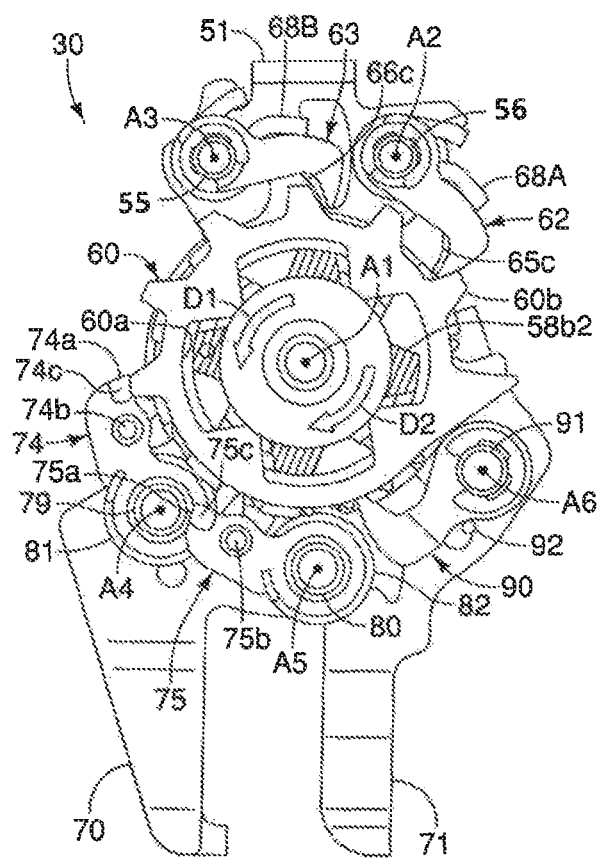
FIG. 47 is a rear elevational view of the selected parts of the bicycle component positioning unit illustrated in FIGS. 27 to 42 with the selected parts returned to their rest positions after the single stage cable pulling operation of FIGS. 44 to 46.

Referring to FIGS. 4, 5, 8, and 43 to 47, a cable pulling operation is illustrated in which the bicycle component positioning unit 30 is moved one shift position from one shift position shown in FIGS. 43 and 44 to the next shift position shown in FIG. 47. In particular, as seen on FIGS. 4, 5 and 8, the cable pulling operation (the shifting operation) is performed by the rider pivoting the second user operating lever 28 from the rest position of FIGS. 4 and 5 to the operated position of FIG. 8 about the shift pivot axis P2 in the direction S2 towards the bicycle longitudinal center plane. As seen in FIG. 5, the abutment 28d of the second user operating lever 28 is arranged to contact the second operating member 71 as the second user operating lever 28 in moved in the direction S2. As a result, the second operating member 71 is pivoted in the second direction D2 about the rotational axis A1 by the second user operating lever 28.

As the second operating member 71 is pivoted in the second direction D2, the second operating member 71 abuts the ends of the control pivot pins 74b and 75b so that the first and second operating members 70 and 71 pivot together as shown in FIGS. 43 and 44. As seen in FIGS. 43 and 44, during the pivotal movement of the second operating member 71 in the second direction D2, the engagement tooth of the pulling pawl 90 engages of the pulling teeth 61b of the pulling ratchet 61 to rotate the p pulling ratchet 61 in the second direction D2. This rotation of the pulling ratchet 61 results in the wire take-up member 58, the positioning ratchet 60, the first release member 65, the second release member 66 and the select member 67 all to be rotated together in the second direction D2. Depending on which one of the first and second maintaining members 62 and 63 is engaged with one of the positioning teeth 60b of the positioning ratchet 60, the rotation of the positioning ratchet 60 will cause the engaged one of the first and second maintaining members 62 and 63 to be disengaged and the other one of the first and second maintaining members 62 and 63 to be engaged. For example, in FIGS. 45 and 46, the second maintaining member 63 is pivoted about the pivot axis A3 by a cam portion of one of the positioning teeth 60b. As a result, the wire take-up member 58, the positioning ratchet 60 and the pulling ratchet 61 are rotated or shifted by one shift position in the second direction D2.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
   a support structure;
   a control body rotatably supported on the support structure about a rotational axis, the control body including a wire take-up member;
   a first release member movably supported on the support structure between a first non-releasing position and a first releasing position;
   a second release member movably supported on the support structure between a second non-releasing position and a second releasing position;
   a first release pawl, the first release pawl being biased toward engagement with the first release member;
   a second release pawl, the second release pawl being biased toward engagement with the second release member;
   a first operating member movably supported on the support structure between a rest position and an operated position, the first and second release pawls being mounted on the first operating member; and
   a select member movably supported on the support structure between at least a first select position and a second select position, the select member being configured such that
      while the select member is in the first select position, the select member permits movement of the first release member with respect to the support structure in response to a movement of the first operating member to the operated position by permitting the first release pawl to engage with the first release member, and prevents movement of the second release member with respect to the support structure in response to the movement of the first operating member by contacting the second release pawl such that the second release pawl does not engage with the second release member, and
      while the select member is in the second select position, the select member permits movement of the second release member with respect to the support structure in response to the movement of the first operating member by permitting the second release pawl to engage with the second release member, and prevents movement of the first release member with respect to the support structure in response to the movement of the first operating member by contacting the first release pawl such that the first release pawl does not engage with the first release member.

2. The bicycle operating device according to claim 1, wherein the first and second release members are rotatably supported on the support structure about a rotational axis.

3. The bicycle operating device according to claim 2, wherein
   the first release member is axially offset from the second release member along the rotational axis.

4. The bicycle operating device according to claim 1, wherein the first release member includes a first release plate having a first pawl contact that is engaged by the first release pawl while the select member is in the first select position, and the second release member includes a second release plate having a second pawl contact that is engaged by the second release pawl while the select member is in the second select position.

5. The bicycle operating device according to claim 1, wherein
the first operating member is pivotally supported on the support structure.

6. The bicycle operating device according to claim 5, wherein
the first and second release members are rotatably supported on the support structure about a rotational axis, and
the first operating member has a pivot axis that is coaxial with the rotational axis of the first and second release members.

7. The bicycle operating device according to claim 1, wherein
the control body movably supports the select member, the select member being movably arranged on the control body to move within a prescribed range relative to the control body, and
a biasing element is operatively coupled between the control body and the select member; the biasing element biasing the select member and the control body in opposite directions relative to each other.

8. The bicycle operating device according to claim 7, wherein
the first and second release members, the select member and the control body are rotatably supported on the support structure about the rotational axis, and
the biasing element biases the control body and the select member in opposite directions relative to each other around the rotational axis.

9. The bicycle operating device according to claim 8, wherein
the wire take-up member has an inner wire connection structure.

10. The bicycle operating device according to claim 9, wherein
the control body includes a positioning member non-movably coupled to the wire take-up member, the positioning member including a plurality of positioning teeth defining a plurality of predetermined positions of the wire take-up member.

11. The bicycle operating device according to claim 10, further comprising
a first maintaining member movably supported by the support structure to selectively move from a first maintaining position to a first non-maintaining position in response to movement of the first release member moving from the first non-releasing position to the first releasing position, the first maintaining member restricting movement of the positioning member and the wire take-up member in a first direction around the rotational axis while the first maintaining member is in the first maintaining position, and the first maintaining member permitting movement of the positioning member and the wire take-up member in the first direction around the rotational axis while the first maintaining member is in the first non-maintaining position; and
a second maintaining member movably supported by the support structure to selectively move from a second maintaining position to a second non-maintaining position in response to movement of the second release member moving from the second non-releasing position to the second releasing position, the second maintaining member restricting movement of the positioning member and the wire take-up member in the first direction around the rotational axis while the second maintaining member is in the second maintaining position, and the second maintaining member permitting movement of the positioning member and the wire take-up member in the first direction around the rotational axis while the second maintaining member is in the second non-maintaining position.

12. The bicycle operating device according to claim 11, wherein
the first maintaining member includes a first maintaining pawl that is biased towards the first maintaining position to selectively engage one of the positioning teeth, and
the second maintaining member includes a second maintaining pawl that is biased towards the second maintaining position to selectively engage one of the positioning teeth.

13. The bicycle operating device according to claim 11, wherein
the first release member includes a first release plate having a first pawl contact that is engaged by the first release pawl while the select member is in the first select position, and
the second release member includes a second release plate having a second pawl contact that is engaged by the second release pawl while the select member is in the second select position.

14. The bicycle operating device according to claim 13, further comprising
a second operating member movably arranged to rotate the positioning member and the wire take-up member in a second direction as the second operating member moves from a second rest position to a second operated position,
the first and second release pawls being biased towards engagement with the first and second release plates, respectively, but held out of engagement with the first and second release plates while the first and second operating members are in the first and second rest positions, respectively.

15. The bicycle operating device according to claim 14, wherein
the first and second operating members are configured to be biased towards the first and second rest positions, respectively.

16. The bicycle operating device according to claim 14, wherein
the positioning member includes a plurality of pulling teeth,
the second operating member includes a pulling pawl that engages the pulling teeth and rotates the positioning member and the wire take-up member in a second direction about the rotational axis as the second operating member moves from the second rest position to the second operated position, the second direction is opposite to the first direction with respect to the rotational axis, and
the pulling pawl is biased towards engagement with the pulling teeth while the first and second operating members are in the first and second rest positions, respectively.

17. The bicycle operating device according to claim 16, wherein
the pulling pawl is moved out of a path of the pulling teeth as the first operating member moves from the first rest position toward the first operated position.

18. The bicycle operating device according to claim 17, wherein
each of the first and second release members includes an abutment that moves the pulling pawl out of engagement with the pulling teeth as each of the first and second release members is moved by movement of the first operating member from the first rest position to the first operated position.

19. A bicycle operating device comprising:
a support structure;
a control body rotatably supported on the support structure about a rotational axis, the control body including a wire take-up member;
a first release member movably supported on the support structure between a first non-releasing position and a first releasing position, the first release member including a first release plate having a first pawl contact;
a second release member movably supported on the support structure between a second non-releasing position and a second releasing position, the second release member including a second release plate having a second pawl contact;
a first release pawl, the first release pawl being biased toward engagement with the first pawl contact;
a second release pawl, the second release pawl being biased toward engagement with the second pawl contact;
an operating member movably supported on the support structure between a rest position and an operated position, the first and second release pawls being mounted on the operating member; and
a select member movably supported on the support structure between at least a first select position and a second select position, the select member being configured such that
while the select member is in the first select position, the select member permits movement of the first release member in response to a movement of the operating member to the operated position by permitting the first release pawl to engage with the first pawl contact, and prevents movement of the second release member in response to the movement of the operating member by contacting the second release pawl such that the second release pawl does not engage with the second pawl contact, and
while the select member is in the second select position, the select member permits movement of the second release member in response to the movement of the operating member by permitting the second release pawl to engage with the second pawl contact, and prevents movement of the first release member in response to the movement of the operating member by contacting the first release pawl such that the first release pawl does not engage with the first pawl contact.

* * * * *